(12) United States Patent
Klabunde et al.

(10) Patent No.: US 10,807,170 B2
(45) Date of Patent: *Oct. 20, 2020

(54) TOOL DEVICE

(71) Applicants: C. & E. FEIN GMBH, Schwaebisch Gmuend-Bargau (DE); ROBERT BOSCH GMBH, Stuttgart (DE)

(72) Inventors: Olaf Klabunde, Giengen/Brenz (DE); Juergen Blickle, Goeppingen (DE); Walter Thomaschewski, Filderstadt (DE); Fabian Bek, Boebingen (DE); Stefano Delfini, Bettlach (CH); Willi Fellmann, Solothurn (CH); Bruno Luescher, Zofingen (CH); Milan Bozic, Solothurn (CH); Thomas Mathys, Lyss (CH); Daniel Grolimund, Zuchwil (CH)

(73) Assignees: C. & E. FEIN GMBH, Schwaebisch Gmuend-Bargau (DE); ROBERT BOSCH GMBH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,678

(22) Filed: Jul. 9, 2018

(65) Prior Publication Data

US 2019/0039145 A1    Feb. 7, 2019

Related U.S. Application Data

(63) Continuation of application No. 14/909,204, filed as application No. PCT/EP2014/002048 on Jul. 25, 2014, now Pat. No. 10,065,248.

(30) Foreign Application Priority Data

Aug. 1, 2013  (DE) .................... 20 2013 006 920 U

(51) Int. Cl.
*B23B 31/10*   (2006.01)
*B27B 5/30*   (2006.01)
(Continued)

(52) U.S. Cl.
CPC ............ *B23B 31/10* (2013.01); *B23D 61/006* (2013.01); *B24B 23/04* (2013.01); *B24B 45/00* (2013.01);
(Continued)

(58) Field of Classification Search
CPC ..... B23B 31/10; B23B 31/4073; B24B 23/04; B24B 45/00; B24B 45/006; B27B 5/30; B27B 5/32; Y10T 279/33
See application file for complete search history.

(56) References Cited

U.S. PATENT DOCUMENTS

| 10,924 | A | 5/1854 | Daboli |
| 32,890 | A | 7/1861 | Pollard |

(Continued)

FOREIGN PATENT DOCUMENTS

| CN | 1357431 | 7/2002 |
| CN | 101066577 | 11/2007 |

(Continued)

OTHER PUBLICATIONS

U.S. Appl. No. 16/028,860, filed Jul. 6, 2018, Klabunde et al.
(Continued)

*Primary Examiner* — Eric A. Gates
(74) *Attorney, Agent, or Firm* — Sheridan Ross P.C.

(57) ABSTRACT

The invention relates to a tool device which is suitable for use with a machine tool, in particular a hand guided machine tool, having a driving device moving, in particular in an oscillating manner, around a driving axis. The tool device has an attachment device which allows it to be fastened on a machine tool such that its driving axis and an axis of (Continued)

rotation of the tool substantially coincide. The attachment device, for absorbing the driving force, has at least two driving area regions, which are spaced apart from said tool axis of rotation and each has a plurality of surface points. The tangent planes to said surface-area points are inclined in regard to an axial plane, which encloses the tool axis of rotation. Furthermore, said tangent planes are inclined regard to a radial plane which extends perpendicularly to the tool axis of rotation. This means that the torque introduced into the tool device by the machine tool, via the driving device, is reliably absorbed.

33 Claims, 24 Drawing Sheets

(51) Int. Cl.
    *B24B 45/00*             (2006.01)
    *B27B 5/32*              (2006.01)
    *B24B 23/04*             (2006.01)
    *B23D 61/00*             (2006.01)

(52) U.S. Cl.
    CPC .............. *B24B 45/006* (2013.01); *B27B 5/30* (2013.01); *B27B 5/32* (2013.01); *Y10T 279/33* (2015.01)

(56) References Cited

U.S. PATENT DOCUMENTS

| | | | |
|---|---|---|---|
| 78,652 | A | 6/1868 | Criag |
| 3,233,908 | A | 2/1966 | Schwartzmayr et al. |
| 3,622,170 | A | 11/1971 | Sedgwick |
| 3,667,169 | A | 6/1972 | MacKay, Jr. |
| 3,667,170 | A | 6/1972 | MacKay, Jr. |
| 3,998,467 | A | 12/1976 | Petkovich |
| 4,205,572 | A | 6/1980 | Weiner |
| 4,747,607 | A | 5/1988 | Emter |
| 5,031,361 | A | 7/1991 | MacKay, Jr. |
| 5,143,495 | A | 9/1992 | Bosek |
| 5,157,873 | A | 10/1992 | Rudolf et al. |
| 5,468,176 | A | 11/1995 | Udert et al. |
| 6,142,858 | A | 11/2000 | Luedeke |
| 6,623,202 | B2 | 9/2003 | Hansson et al. |
| 6,796,888 | B2 | 9/2004 | Jasch |
| 6,887,142 | B2 | 5/2005 | Rupprecht et al. |
| 7,997,586 | B2 | 8/2011 | Ziegler et al. |
| 8,042,437 | B2 | 10/2011 | Maier et al. |
| 8,113,520 | B2 | 2/2012 | Zaiser et al. |
| 8,151,679 | B2 | 4/2012 | Bohne |
| 9,108,255 | B2 | 8/2015 | Li |
| 9,120,216 | B2 | 9/2015 | Zhang et al. |
| 9,174,354 | B2 | 11/2015 | Zhou |
| 9,517,510 | B2 | 12/2016 | Zhang |
| 9,555,554 | B2 | 1/2017 | Thorson et al. |
| 9,737,969 | B2 | 8/2017 | Bek et al. |
| 10,052,695 | B2 | 8/2018 | Klabunde et al. |
| 10,065,248 | B2 | 9/2018 | Klabunde et al. |
| 10,124,461 | B2 | 11/2018 | Kuehne et al. |
| 2005/0095966 | A1 | 5/2005 | Jasch et al. |
| 2010/0052269 | A1 | 3/2010 | Zaiser et al. |
| 2010/0056029 | A1 | 3/2010 | Grunikiewicz |
| 2011/0086582 | A1 | 4/2011 | Takemura et al. |
| 2011/0266759 | A1 | 11/2011 | Goldman |
| 2011/0316242 | A1 | 12/2011 | Zhang et al. |
| 2012/0169018 | A1 | 7/2012 | Lu et al. |
| 2012/0170976 | A1 | 7/2012 | Cai |
| 2014/0290072 | A1 | 10/2014 | Brown et al. |
| 2016/0184956 | A1 | 6/2016 | Klabunde et al. |
| 2017/0057050 | A1 | 3/2017 | Montplaisir et al. |

FOREIGN PATENT DOCUMENTS

| | | |
|---|---|---|
| CN | 100534708 | 9/2009 |
| CN | 101837579 | 9/2010 |
| CN | 102294682 | 12/2011 |
| CN | 202114710 | 1/2012 |
| CN | 102950586 | 3/2013 |
| CN | 102974741 | 3/2013 |
| DE | 2120669 | 1/1972 |
| DE | 3100096 | 8/1982 |
| DE | 29605728 | 9/1996 |
| DE | 10030586 | 1/2002 |
| DE | 102005031802 | 1/2007 |
| DE | 102005047402 | 4/2007 |
| DE | 202011050511 | 11/2011 |
| DE | 102010046629 | 3/2012 |
| DE | 102011005021 | 9/2012 |
| DE | 102011005818 | 9/2012 |
| DE | 102011085561 | 12/2012 |
| EP | 0577579 | 1/1994 |
| EP | 0596831 | 5/1994 |
| EP | 1302286 | 4/2003 |
| EP | 1852218 | 11/2007 |
| EP | 2623262 | 11/2018 |
| FR | 2131299 | 11/1972 |
| JP | S52-069085 | 5/1977 |
| JP | 54-054988 | 4/1979 |
| JP | S58-055845 | 4/1983 |
| JP | S63-278735 | 11/1988 |
| JP | H02-082435 | 6/1990 |
| JP | H06-190730 | 7/1994 |
| JP | 3021990 | 12/1995 |
| JP | 2002-233972 | 8/2002 |
| JP | 2003-533358 | 11/2003 |
| JP | 2011-245603 | 12/2011 |
| JP | 2013-094905 | 5/2013 |
| RU | 2179106 | 2/2002 |
| SU | 812542 | 3/1981 |
| WO | WO 96/23627 | 8/1996 |
| WO | WO 2005/049275 | 6/2005 |
| WO | WO 2005/102605 | 11/2005 |
| WO | WO 2012/007203 | 1/2012 |
| WO | WO 2012/150066 | 11/2012 |
| WO | WO 2013/044844 | 4/2013 |

OTHER PUBLICATIONS

International Search Report for International (PCT) Patent Application No. PCT/EP2014/002048, dated Nov. 19, 2014, 5 pages (with English translation).
Written Opinion for International (PCT) Patent Application No. PCT/EP2014/002048, dated Nov. 19, 2014, 14 pages (with English translation).
International Preliminary Report on Patentability for International (PCT) Patent Application No. PCT/EP2014/002048, dated Feb. 2, 2016, 16 pages (with English translation).
Official Action for Australia Patent Application No. 2014298902, dated May 25, 2017, 4 pages.
Official Action for Australia Patent Application No. 2014298902, dated Feb. 13, 2018, 5 pages.
Official Action for China Patent Application No. 201480043616.5, dated May 4, 2017, 16 pages.
Examination Report for EP Patent Application No. 14747835.8, dated Feb. 17, 2017, 7 pages (no translation).
Search and Examination Report (with English machine translation) for Russian Patent Application No. 2016107074, dated Oct. 20, 2017, 22 pages.
International Search Report for International (PCT) Patent Application No. PCT/EP2014/002049, dated Oct. 27, 2014, 6 pages (with English translation).
Written Opinion for International (PCT) Patent Application No. PCT/EP2014/002049, dated Oct. 27, 2014, 12 pages (with English translation).
International Preliminary Report on Patentability for International (PCT) Patent Application No. PCT/EP2014/002049, dated Feb. 2, 2016, 14 pages (with English translation).

(56) References Cited

OTHER PUBLICATIONS

Official Action for Australia Patent Application No. 2014298903, dated May 25, 2017, 3 pages.
Official Action for Australia Patent Application No. 2014298903, dated Dec. 8, 2017, 6 pages.
Official Action for Australia Patent Application No. 2014298903, dated Feb. 13, 2018, 3 pages.
Official Action (with English Translation) for CN Patent Application No. 201480043578.3, dated Feb. 24, 2017, 12 pages.
Official Action and Search Report with machine translation for Russia Patent Application No. 2016107066/02, dated Apr. 26, 2018, 9 pages.
International Search Report for International (PCT) Patent Application No. PCT/EP2014/002050, dated Feb. 10, 2014, 5 pages (with English translation).
Written Opinion for International (PCT) Patent Application No. PCT/EP2014/002050, dated Feb. 10, 2014, 13 pages (with English translation).
International Preliminary Report on Patentability for International (PCT) Patent Application No. PCT/EP2014/002050, dated Feb. 2, 2016, 15 pages (with English translation).
Official Action with English Translation for China Patent Application No. 2014800435548, dated May 2, 2017, 13 pages.
Official Action with machine translation for European Patent Application No. 14745083.7, dated Mar. 1, 2017, 8 pages.
Official Action and Search Report with machine translation for Russia Patent Application No. 2016107071/02 dated Apr. 24, 2018, 11 pages.
Official Action for U.S. Appl. No. 14/909,204, dated Jul. 31, 2017 8 pages Restriction Requirement.
Official Action for U.S. Appl. No. 14/909,204, dated Dec. 14, 2017 16 pages.
Notice of Allowance for U.S. Appl. No. 14/909,204, dated Apr. 27, 2018 8 pages.
Official Action for U.S. Appl. No. 14/909,233, dated Aug. 10, 2017 17 pages.
Official Action for U.S. Appl. No. 14/909,247, dated Jun. 23, 2017 9 pages Restriction Requirement.
Official Action for U.S. Appl. No. 14/909,247, dated Nov. 20, 2017 11 pages.
Official Action for U.S. Appl. No. 14/909,247, dated May 30, 2018 9 pages.
Official Action with machine translation for Japan Patent Application No. 2016-530375, dated Aug. 21, 2018, 11 pages.
Official Action with English Translation for Japan Patent Application No. 2016-530376, dated Jul. 3, 2018, 9 pages.
Official Action with machine Translation for China Patent Application No. 201480043554.8, dated Jul. 30, 2018, 19 pages.
Official Action with machine Translation for Japan Patent Application No. 2016-530377, dated Aug. 7, 2018, 9 pages.
Notice of Allowance for U.S. Appl. No. 14/909,233, dated Mar. 27, 2018 9 pages.
Official Action for U.S. Appl. No. 14/909,247, dated Nov. 30, 2018 8 pages.
Official Action with machine translation for Japan Patent Application No. 2016-530376, dated May 28, 2019, 10 pages.
Official Action with machine translation for Japan Patent Application No. 2016-530377, dated Jun. 4, 2019, 6 pages.
Official Action for U.S. Appl. No. 16/028,860, dated Jun. 3, 2019 13 pages.
Notice of Allowance for U.S. Appl. No. 14/909,247, dated Jun. 3, 2019 13 pages.
Official Action for U.S. Appl. No. 16/028,860, dated Dec. 19, 2019 12 pages.
Official Action for U.S. Appl. No. 16/028,860, dated Apr. 16, 2020 14 pages.
Official Action for European Patent Application No. 14744284.2, dated Jul. 6, 2020, 6 pages.

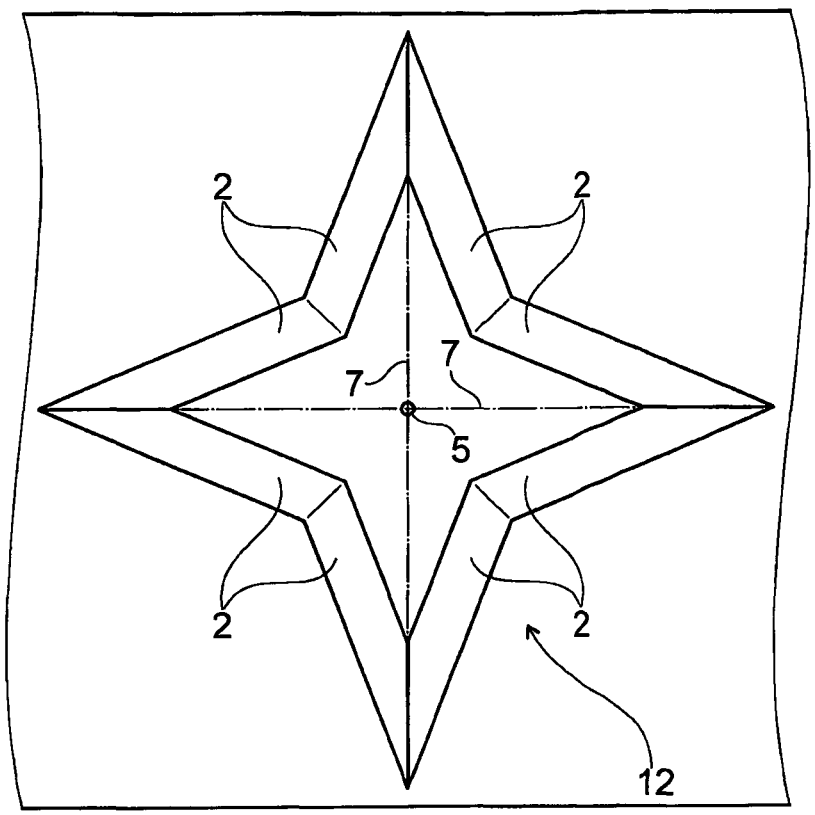
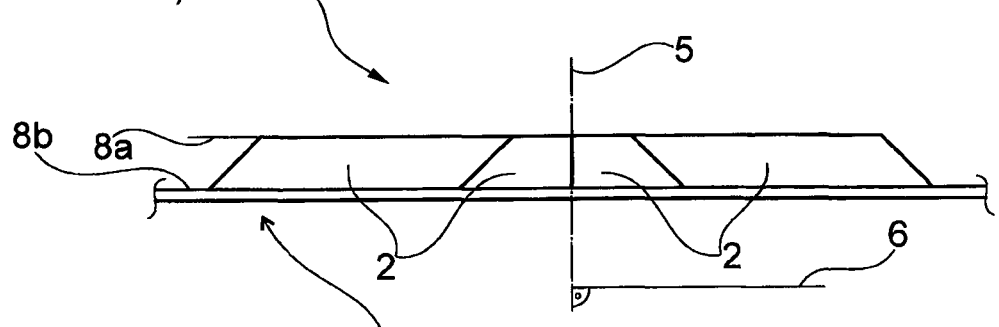
Fig. 6

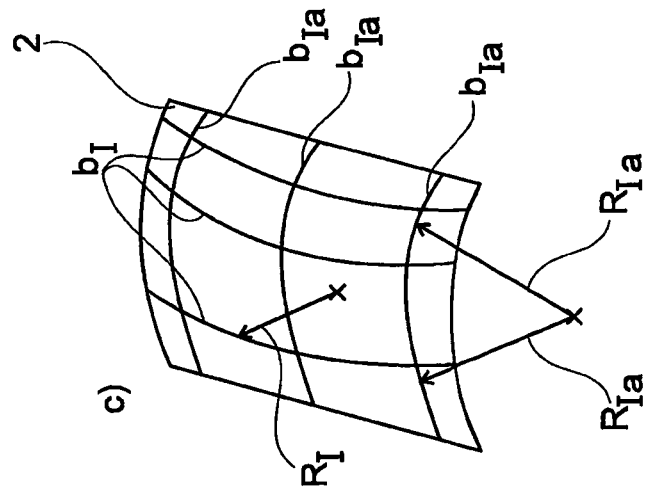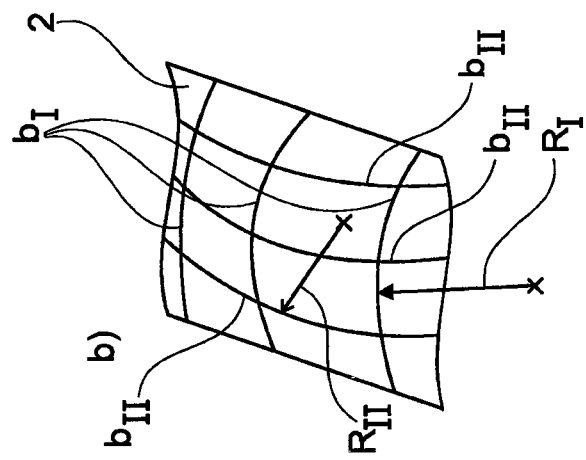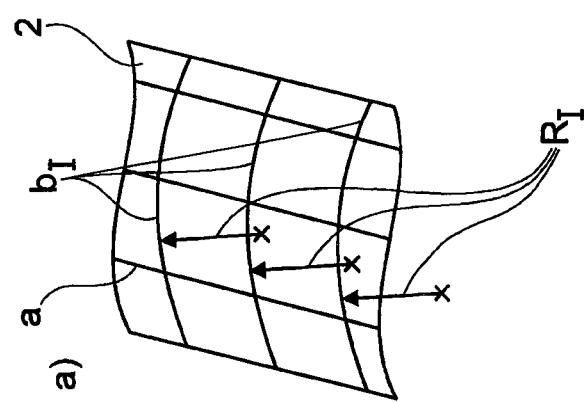
Fig. 14

TOOL DEVICE

CROSS REFERENCE TO RELATED APPLICATIONS

This application is continuation of and claims the benefit of priority of U.S. application Ser. No. 14/909,204 filed on Feb. 1, 2016, which is a national stage application under 35 U.S.C. 371 and claims the benefit of PCT Application No. PCT/EP2014/002048 having an international filing date of 25 Jul. 2014, which designated the United States, which PCT application claimed the benefit of German Patent Application No. DE 20 2013 006 920.1 filed 1 Aug. 2013, the entire disclosures of each of which are incorporated by reference herein.

FIELD OF THE INVENTION

The present invention relates to a tool device, which is suited to be used with a machine tool, and in particular with a hand guided machine tool having a driving device moving around a driving axis.

SUMMARY OF THE INVENTION

The invention will be described below mainly using the example of a tool device, which is suited for the use with a machine tool, and in particular for the use with a hand guided machine tool that has a driving device rotating around a driving axis. This limitation of the illustration is not intended to limit the possible uses of such a tool device.

Instead of the term "tool device", hereinafter will also be used in a more simple way the term "tool". But this too, should not to be construed as a limitation.

A machine tool is a device which has one or more driving motors and possibly one or more transmission devices. The driving device of the tool device is the component or the components, respectively, by which the torque is applied to the tool device, so usually a driving shaft/output shaft, a driving spindle/an output spindle or the like.

A hand guided machine tool comprises a holding device, especially handles and the like, by which the machine tool can be guided by an operator with the tool attached thereto. Typically, the hand guided machine tools are equipped with an electric driving motor, but there are also other types known, such as hydraulically powered machine tools or pneumatically powered machine tools or machine tools driven by muscle power.

In the prior art, a variety of tools are known, which are intended to be used with a machine tool having a circumferential driving device. Such tools are, for example drills, grinding discs, cutting discs, circular saws, and so on. These tools are attached to the output device, which—depending on the application, the tool and the machine—rotates with a speed between near 0 up to several 1000 revolutions per minute, and in extreme cases also at a significantly higher speed. During the operation, the tool is brought in contact with a work piece by a more or less high pressure, where it then carries out the corresponding machining operation. The machining forces occurring in the distance from the pivot, for example the cutting forces or the grinding forces result in a torque around the driving shaft, which is compensated for by the torque transmitted from the machine tool to the tool device. The transmission of the driving momentum to the tool is made via the attachment device of the tool by which it is fixed to the driving device. For a tool, which during the machining always rotates essentially in the same direction, therefore, the forces acting on the attachment device occur essentially in the same direction, but are different in height.

In the prior art, machine tools having a rotating oscillating tool receiving device are also known. An oscillating drive of the tool device should here be understood as no hub oscillating drive, like it is known from a hacksaw device in particular. A hacksaw device should here be understood in particular as a keyhole saw device, a saber saw device or drywall saw device or the like. A machine tool having an oscillating driving device should here be understood as a machine tool with a movement of the tool driving device, when the tool driving device starts moving from a central position in a first rotational direction and it is braked to a stop, and then the direction of rotation is reversed again until the moving is stopped.

The angular distance from the central position to the respective end position may typically be up to 5 degrees. However, for the implemented machines, usually, lower angles of 1 degree to 2.5 degrees are common, which corresponds to a total angular movement (1st to 2nd end position) from 2 degrees to 5 degrees. This oscillatory movement is typically carried out from 5,000 to 50,000 times per minute. However, there are also smaller and higher oscillation frequencies possible (here expressed as oscillations per minute).

The reversal of the direction of rotation causes that the machining forces of the tool also change their direction, wherein as known the machining forces act always against the direction of movement, or here against the rotational direction, respectively. From the machining forces changing their direction results a torque in correspondence to the lever arm, that is the distance of the processing point of the tool to the rotational axis, wherein the torque reverses the direction by the oscillation. The torque resulting from the machining forces is superimposed with another momentum, which is effective both during the machining but also in the idle, namely from the momentum of inertia of the tool torque for the decelerating of the tool after its highest speed (for example, each maximum amplitude of the sine curve for a sinusoidal rotational speed variation of the tool driving device) and the reacceleration of the tool in the opposite direction occurring after the rotation reversal.

The torques, that arise by the machining forces and by the kinematic factors of the oscillation drive are applied by the machine tool and introduced via the driving device in the tool device.

The present invention has the object to design the tool device in such a manner that the torque, which has been introduced via the driving device, can be reliably absorbed.

This object is achieved by the subject matter of claim 1.

The preferred embodiments of the present invention are the subject matter of the dependent claims.

According to the present invention, the tool device comprises an attachment device by which the tool device can be fastened on the machine tool in such a manner that its driving shaft and a tool axis of rotation are substantially coincident. The term "driving shaft" and "tool axis of rotation" denotes the geometrical axis of rotation of the machine tool and the geometrical axis of rotation of the tool device, respectively.

Furthermore, at least two driving area regions are provided, which are spaced apart to this tool axis of rotation, each having a plurality of surface points. The term "driving area region" (hereinafter sometimes referred to as "driving area") refers to an area that directly or indirectly stands at least partially in contact with the output device of the machine tool to accommodate the torque from the machine tool. The term "surface point" here means points on the upper side of the driving area region and it should be understood geometrically.

The term is used to characterize the geometric point at which a tangent plane abuts against the area. The vector on the surface perpendicular to the tangent point describes the orientation of the surface at this point in a space, which is defined by, for example, a three-dimensional coordinate system or by other reference planes or reference surfaces.

A surface has an endless number of surface points because every point on the surface is also a surface point in the present sense. To describe a unidirectional curved surface or a multidirectional curved surface for the practice, however, it is sufficient to have a finite number of surface points. The term unidirectionally curved should be understood as a cylindrical surface, which is curved at each point in only one direction, for example a cylindrical surface. The term multidirectionally curved should be understood as a surface, which is curved at least in one point in several directions, for example a spherical surface.

A flat surface has only one tangent plane, which coincides with the surface itself. To characterize a flat surface, therefore a single surface point is sufficient, and this can be any point of the flat surface.

Since surface points are geometric points, they are not visible on the surface.

For the tangent planes to these surface points, special geometric conditions apply. The tangent planes, as usually in the geometry, are the planes which are formed perpendicular to the normal vectors of the surface points and which contact the surface at the surface point. The term "normal vector" means a vector which is oriented in this surface point exactly perpendicular to the surface.

The tangent planes on this surface points are inclined in two directions. On the one hand, the tangent planes are inclined against an axial plane, which includes the output shaft. Further, these tangent planes are inclined in regard to a radial plane, which extends perpendicular to the output shaft.

Thus, the arrangement of this driving area region differs compared with the known prior art tool devices for the oscillating machines.

For the known tool devices, as shown for example in the German patent application DE 10 2011 005 818 A1 and the German utility model application DE 296 05 728 U1, the tools in the connection region to the driving device of the machine tool are of a substantially planar design. That means that they extend in this area in a plane, which is perpendicular to the tool axis of rotation.

It should now already be noted that in a preferred embodiment, the driving area region is substantially flat, meaning that the normal vectors of all surface points are aligned parallel to one another, and thus the driving area region only has a single tangent plane as a whole. However, within the scope of the present invention, is also possible that the driving area regions are curved in an unidirectional manner or in a bidirectional manner. In this case, the normal vectors are then no longer parallel to each other.

The invention is based on the following considerations:

The region of the tool, onto which the torque is applied, is subjected to an alternating bending stress due to the oscillating moving. These are particularly problematic for the metallic materials from which the tools at issue here are usually made. The metals have a crystalline structure. If local overloads arise in a region of a metal component, that means that the stresses acting on the component at this point are higher than the stresses that can be tolerated by the component, then micro cracks can occur between the individual grains of the metal microstructure. These micro cracks affect the strength of the component in two respects. On the one hand, in the region where micro cracks have been incurred, no tensions are transmitted in the component. This means that the stresses within this region can be increased by the crack formation, which decreases the effective area for the force transmission.

On the other hand, a phenomenon arises that is commonly referred to as the "notch effect" in mechanical engineering. The name comes from the fact that in the region of a notch, especially when the notch is sharp edged, a local stress concentration occurs, which in the region of the surrounding notch material leads to shear stresses, which are higher than the shear stresses in the regions of the component which are not affected by such a geometry.

These increased stresses cause the crack formation to progress, and it eventually leads to a failure of the component.

This process, which for example is documented in the works of Palmgren and Miner, is called damage accumulation.

The properties of a material or a component to tolerate swinging loads and in particular alternating bending stresses, is usually represented by the so-called SN curve of this component. The SN curve is based on the finding that an alternating load, for the Wöhler fatigue test it is called load changes, in particular for a steel comprising component can be tolerated in many cases on a permanent basis if the component can incur between 2 million and 6 million (in dependence on the material) such load changes at this load without a damage. In mechanical engineering, one speaks then of the so-called fatigue strength of the material or the component.

An oscillating driven tool swings, as indicated above, for example with a frequency of 20,000 oscillations per minute. This means 20,000 load cycles per minute in the diction of the operation fixed component design or 1.2 million cycles per hour.

The lower fatigue limit of the stress-test of 2 million load cycles is thus exceeded already after 2 hours of operation of the machine tool or the tool.

Due to the inventive design, the torque load is increased that can be tolerated by the tool device. This is firstly achieved in that the driving areas are arranged at a distance to the axis of rotation. Since the force that be accommodated by the tool is determined as the ratio of the torque and the distance, it follows $F_r=M/r$ (M measured as a torque in Nm, F as a force at the point r in N and r is the distance of the force application point away from the tool axis of rotation in m).

An enlargement of the force application point outwards, i.e. away from the tool axis of rotation, reduces the torque.

The inclination of the driving areas further results into that the force application point is as a whole increased, whereby the local load is reduced, and for an appropriate design, the introduction of the force in the remaining regions of the tool is improved.

A portion of the tool devices, which are commonly used at oscillating machines, has an operating region, which is arranged in the circumferential direction, such as sawing tools and cutting tools. The operating region of the tools thus extends substantially in a plane perpendicular to the axis of rotation of the tool.

For such tools, it is common in the prior art, that the attachment region is also planar constructed. The driving momentum is then initiated as a force in a direction perpendicular to the tool plane, for example by pins, a driving star or the like. In the tool plane, the tool is especially stiff, so that the introduction of the force is performed only over a relatively small region. In this region, it can then lead to higher local stresses, which lead to a reduction in the operational stability of the tool.

According to the present invention the force transmission is performed for such a tool at first from the inclined area, whereby—for a respective construction—the force transmission area is increased, and thereby the local load is reduced.

It should be noted at this point that it is essential to reduce the peak loads. Because the wear or even the destruction of the tool is generated and further promoted just by the above described stress concentrations that lead to micro cracks. A reduction of the peak stress concentrations can achieve a significant extension of the life of the tool.

According to a preferred embodiment, there is at least one driving area region, for which at no surface point, the normal vector on this surface point passes on a straight line extending through that the tool axis of rotation. Therefore, such a driving area region is at no surface point oriented toward the tool axis of rotation, but the driving area region is "twisted" in regard to the tool axis of rotation. Thereby, the driving forces of the machine tool are introduced tangentially on this driving area region at no point on the surface, so that the torque transmission is further improved.

As already explained above, the driving areas are preferably designed substantially flat. This means that the driving areas have a planar region with essentially the same tangent plane, which may be limited by edges, single curved surfaces or multiple curved surfaces, and so on. Respectively, by edges or curved areas, they can pass over into other regions of the tool device.

The advantage of the planar driving areas is that by these a tool device can be provided, which on the one hand, both can be secured without clearance on the driving device of the machine tool—if it is designed accordingly—and for which, when appropriate tolerances and material properties such as elasticity and so forth are provided, an area contact between the driving device of the machine tool and the tool device is possible, whereby the region of the force transmission is increased.

According to a further preferred embodiment, the driving areas are curved, at least in sections. The curvature may be designed both unidirectional as well as bidirectional, convex or concave with a fixed radius of curvature or a variable radius of curvature.

The curved areas can also be designed such that by their shape and elasticity of the material, they are subjected to an elasticity, by which the curvature changes, and in particular by which the curvature disappears essentially from a certain load. That means that a substantially planar driving area is provided.

In a preferred embodiment, the tool device comprises in the region of the attachment device at least a first upper boundary plane and at least a second lower boundary plane. In this case, these boundary planes are disposed substantially perpendicular to said tool axis of rotation. Further preferably, these two boundary planes are spaced apart. Preferably, each of these driving area regions is arranged between one of these first upper boundary planes and one of these second lower boundary planes, preferably in such a manner that the driving area region contacts the respective boundary plane, but that it does not cut it. In particular, by the arrangement of at least one driving area region between these boundary planes, a very large driving area region can be achieved and the stress on this driving area region is correspondingly low. Preferably, a first group of driving area regions, but at least one driving area region is arranged between one of said first upper boundary planes and one of said second lower limit levels, and more preferably a second group of driving area regions is arranged between a further first upper boundary plane and a further second lower boundary plane. In particular, by the grouping of several of driving area regions and by the assignment of the boundary planes, both a simple production of the tool device is possible, and secondly, a particularly homogeneous introduction of the torque on the tool device can be achieved.

In a preferred embodiment, a plurality of driving area regions extends between a single first upper boundary plane and a single second lower the upper boundary plane. More preferably, all of these driving area regions extend between a single first upper boundary plane and a single second lower boundary plane. In particular, by the extension of these driving area regions between one first upper boundary plane and one second lower boundary plane, a torque transmission area with low space requirement can be achieved, and moreover, a lower necessary material usage can be achieved. It is also advantageous, in particular, by this type of design of the driving area regions, to achieve that the torque is transmitted in a particularly uniform and thus gentle manner to the material to the tool device.

In a preferred embodiment, at least a first boundary plane and a second boundary plane are provided, which are spaced apart from each other by a distance T. Preferably, the tool device comprises, in particular in the region of the attachment device substantially a wall thickness t. Further preferably, the distance T is selected in relation to the wall thickness t from a defined range. It has proven to be advantageous to set the distance T and the wall thickness t in a relation. In particular, by this, favorable stiffness ratios in the attachment region of the tool device can be achieved and thus a favorable torque introduction from the machine tool into the tool device can be achieved. Preferably, the distance T is selected from a range, wherein T is preferably larger than one times t, preferably t is larger than two times t, and more preferably it is larger than three times t, and further preferably, the distance T is smaller than 20 times t, preferably it is smaller than 10 times t, and more preferably it is smaller than 5 times t. In particular, if the wall thickness t is in a range between 0.75 and 3 mm, preferably if it is in a range between 1 to 1.5 mm, the distance T is particularly preferably essentially 3.5 times t. For the present case, this is essentially+/−0.75 times t. In particular, by having this relationship between the distance T and the wall thickness t, stiffness ratios in the range of the attachment device of the tool device can be achieved, by which particularly favorable torque introduction into the tool device can be achieved, and thus a long service life of the tool device can be achieved.

In a preferred embodiment, the torque transmission region comprises a plurality of driving area regions. Preferably, said plurality of driving area regions is arranged rotationally symmetrical around the tool axis of rotation.

"Rotationally symmetrical around the tool axis of rotation" in the sense of the present application should mean that the plurality of driving area regions merges—seen geometrically—into itself by rotating around the tool axis of rotation by at least an angle being greater than 0 degrees and smaller than 360 degrees—or also by any angle. In particular, one of these angles is 360 degrees/n, where n is a natural number greater than 1.

In particular, by a rotationally symmetrical arrangement of the driving surface regions, it is possible to reduce the additional stresses on the tool device and to evenly stress the driving area regions, respectively, and thus in particular to achieve an increased service life. Further preferably, for a rotationally symmetrical alignment of the driving area regions, the tool device can be accommodated in different angular positions in regard to the tool axis of rotation. Preferably, the tool device can be shifted by discrete angular steps around the tool axis of rotation and it can be accommodated on the machine tool.

In a preferred embodiment, at least two of these driving area regions are arranged symmetrically to a plane of symmetry. Preferably, more than two of these driving area regions are arranged symmetrically to the plane of symmetry, preferably four. Here, in particular the tool axis of rotation is in the plane of symmetry. Further preferably, these driving area regions are arranged substantially in an abutting manner. An abutting arrangement in the sense of the invention can be in particular understood as such an arrangement, when the driving area regions are connected by a transition region. Preferably, such a transition region may be formed by a curved area region or by an at least partially flat extending area region. More preferably, such a transition region abuts tangentially on at least one, preferably on both of these driving area regions. In particular, by a symmetrical and also abutting arrangement of the driving area regions, a particularly high stability of the driving area regions can be achieved, and therefore a good force transmission to the tool device can be achieved.

In a preferred embodiment, the attachment device has a side wall. Preferably, said side wall is extending radially spaced from the tool axis of rotation. Further preferably, this side wall is extending between the first upper boundary plane and the second lower boundary plane. Preferably, this side wall comprises the driving area regions. In particular, the design of the attachment region with a side wall results in a substantially hollow conical recess in the region of the attachment region, but this hollow conical recess has no circular cross section, but a cross section with a variable spacing of the side wall to the tool axis of rotation in a direction orthogonal to the tool axis of rotation. In particular, by the described type of embodiment of the attachment region, a particularly stable attachment region, and thus a good introduction of the torque into the tool device can be achieved.

In a preferred embodiment, the side wall has substantially an average wall thickness $t_1$. Preferably, the average wall thickness corresponds substantially to the wall thickness t. Here, this wall thickness $t_1$ and t, respectively, is preferably selected from a defined range, wherein said wall thickness is preferably greater than or equal to 0.2 mm, preferably it is greater than 0.5 mm, and more preferably it is greater than 0.8 mm. Further preferably, the wall thickness is smaller than or equal to 4 mm, preferably it is smaller than 2 mm, and more preferably it is smaller than 1.5 mm. More preferably, the wall thickness t is substantially 1 mm or 1.5 mm, or preferably it is also a dimension between 1 mm and 1.5 mm. In particular, by choosing a suitable wall thickness in the aforementioned range, it is possible to obtain one the hand a tool having a slight and thus a low momentum of inertia, and on the other hand a tool being sufficiently stable.

In a preferred embodiment, this side wall extends essentially radially closed around the tool axis of rotation. In another embodiment, the side wall has recesses or interruptions on in its extension around the tool axis of rotation. In particular, by a closed circumferential side wall, a particularly stable attachment region can be achieved; by a broken side wall or by a side wall having recesses, an attachment device can be achieved which has particularly light and low momentum of inertia.

In a preferred embodiment, the attachment device has a cover surface section. Preferably, this cover surface section attaches indirectly or indirectly to at least one of these driving area regions. In this case, indirect connection of cover surface section with one of driving area regions should be understood, in particular in that the surface section and the driving area region are connected by a connection region to each other. In this case, such a connection portion should be preferably understood as a curved wall or as a, at least in sections, straight extending wall. Preferably, the direct connection of cover surface section with at least one of these driving area regions should be understand in that this cover surface section is separated from the driving area region only by a production related intermediate section, or that it directly adjoins it. Such a production related intermediate section should be in particular understood as a bending radius, a slope form or the like. Preferably, the extension of this cover surface section has at least one area component perpendicular to the tool axis of rotation. Further preferably, the cover surface section extends at least in sections substantially perpendicular to the tool axis of rotation. Preferably, by this configuration of the cover surface section, an additional stabilization of the driving area regions can be achieved.

In a preferred embodiment, the cover surface section is arranged substantially in the region of one of these first upper boundary planes. Preferably, the attachment device has a particularly small radial extension in the region, in which the cover surface section is arranged. Further preferably, the cover surface section is substantially in the region of the first upper boundary planes, further preferably it is arranged between one of the first upper boundary planes and the lower boundary planes. In particular, the arrangement of cover surface section in the region of the first upper boundary plane is made easily, and it can in particular lead to an additional stabilization of the attachment device.

In a preferred embodiment, the cover surface section extends in the radial direction from radially outward toward the tool axis of rotation. Further preferably, the cover surface section has at least one recess. Further preferably, this cover surface section has several, preferably a plurality of recesses. In particular, by these recesses, the rotational inertia of the tool device can be reduced, and thus its stress can be reduced.

In a preferred embodiment, at least one of these recesses is arranged substantially in the region of the tool axis of rotation. Further preferably, a plurality of these recesses is arranged substantially in the range of this tool axis of rotation. Substantially in the range of this tool axis of rotation should be understood as in particular that one of these recesses includes the tool axis of rotation, or that at least one of these recesses immediately adjoins to the tool axis of rotation, or that it has only a small distance therefrom. In particular, by the one or the several recesses in the region of the tool axis of rotation, a simple attachment of the tool device on a machine tool can be achieved, and thus a good transmission of the force from the machine tool to the tool device can be achieved.

In a preferred embodiment, one of or several of these recesses are arranged rotationally symmetrically around the tool axis of rotation. Further preferably, all of these recesses are arranged rotationally symmetrical around the tool axis of rotation. In particular, by this type of alignment of the recesses, an unbalancing with the movement of said tool device can be avoided or reduced, so that an improved tool device can be achieved.

In preferred embodiment, one of the normal vectors on one of these tangent planes is oriented in the radial direction toward to the output shaft. Preferably, the normal vectors of several of, preferably of all of these tangent planes in the radial direction are oriented away from the tool axis of rotation. In particular, by this orientation of the tangent planes, the attachment device provides the shaft as compared to a conventional shaft hub connection. This configuration of the attachment region provides in particular the possibility of a simple production, and that the driving forces of the machine tool are can be transmitted particularly uniform on the tool device.

In a preferred embodiment, one of the normal vectors on one of these tangent planes is oriented in the radial direction to the tool axis of rotation. Preferably, the normal vectors of several of, preferably of all of the tangent planes are oriented in the radial direction to the tool axis of rotation. In particular, by this orientation of the tangent, the attachment device provides the hub portion in comparison with a conventional shaft hub connection. In such a configuration of the attachment region, the driving forces are transmitted by to internal surface (hub portion), such surfaces are protected particularly well against dirt and damage.

In a preferred embodiment, the tool device comprises at least one operating region, at least one attachment region and at least one connection region. Preferably, the operating region is configured to act on a work piece arrangement or on a work piece. A work piece or a work piece arrangement should be in particular understood as a semi-finished product, a machine element, a component, an arrangement of several of these elements, a machine, preferably a component of a motor vehicle, a building material, a building or the like. A operating region should be preferably understood as a cutting device, a grinding device, a cutting device, a scraping, a lever device or the like. Further preferably, a connection region should be understood as a section of said tool device, through which the driving forces are transmitted from the attachment region to the operating region, wherein in attachment region the driving forces are introduced from the machine tool onto the tool device. Further preferably, the connecting portion is a flat section, a curved section, a corrugated section or a bent section. Further preferably, this connection region is integrally formed with at least this operating region, or at least with this attachment device. Preferably, this connection region can be made of the same or of a different material as that of the operating region or the attachment device, and it can be connected to them. Preferably, this connection is form fit connection, force fit connection or material fit connection or preferably a combination of several of these types of connection. Particularly preferably, it is welded, riveted, caulked or screwed. Further preferably, a single connection region is disposed between the attachment device and each of those operating regions. In particular, the described configuration of the tool device with the attachment device, the operating region and the connection region, an advantageous transmission of the driving forces from the connection device to the operating region can be achieved.

In a preferred embodiment, at least one of these connection regions is disposed in a certain region of the attachment device. Preferably, at least one of these connection regions is arranged substantially within the region of one of the second lower boundary planes, which is further away from a receiving machine tool than the second upper lower boundary planes. Preferably, it is arranged in the region of one of the first upper boundary planes, and more preferably it is arranged between these boundary planes. Further preferably, at least one of these connection regions coincide substantially with this second lower boundary planes. Further preferably, all of the connection regions are arranged in the form described above. Further preferably, the cover surface section, and preferably one of, more preferably all of the connection regions are disposed diametrically opposed to the connection device. That is, the cover surface section is disposed in the region of the first upper boundary plane/at least one of or preferably all of connection regions are arranged in the area of the second boundary plane or vice versa. In particular, by the described type of construction and arrangement of the connection regions, a particularly stable tool device can be achieved, and thus a uniform introduction of the torque into the tool device can be achieved.

In a preferred embodiment, the angle $\alpha$ is included between one of these tangent planes and this radial plane, wherein said radial plane is perpendicular to the output shaft. Preferably, the angle $\alpha$ is selected from a certain range, wherein the angle $\alpha$ is preferably smaller than 90 degrees, in particular it is smaller than 80 degrees and most preferably it is smaller than 75 degrees. Further preferably, the angle $\alpha$ is greater than 0 degrees, in particular it is greater than 45 degrees, and most preferably it is greater than 60 degrees. More preferably, the angle $\alpha$ is in a range between 62.5 degrees and 72.5 degrees. Preferably, the angle $\alpha$ is selected in the above mentioned range due to the component properties (in particular the geometry, the wall thickness, the modulus of elasticity, the strength and the like) of the torque transmission region and/or the tool device and/or it is preferred because of the occurring forces. In particular, by the previously described selection of the angle $\alpha$ out of said range, a stable torque transmission region can be achieved, and on the other hand also a uniform introduction of the driving forces into the tool device. It is usually preferred to choose the angle $\alpha$ smaller than 70 degrees, since the risk of jamming is then lower. Here, the term "jamming" should be construed in such a way that the tool device can not be removed from the machine tool as scheduled, which means in particular without an additional force. Effects similar to this "jamming" are known in mechanics especially as a self-locking. As an advantage, an angle $\alpha$, which has been selected from said range ($\alpha \geq 70$ degrees), results into a particularly low space requirement. As a further advantage, the tendency to the jamming of the tool device can be reduced in this torque transmission region by a smaller angle $\alpha$ ($\alpha < 70$ degrees). As a particularly preferred range for the angle $\alpha$, the range of 60 degrees (+/−5 degrees) has shown that in this way a relatively small installation space can be achieved and that an accidental jamming of the tool device can be reduced or avoided.

In a preferred embodiment, the angle ß is enclosed between one of these tangent planes and this axial plane, wherein the output shaft is located in this axial plane. Preferably, the angle ß is selected from a certain range, wherein the angle ß is preferably smaller than 90 degrees, in particular it is smaller than 70 degrees, and most preferably it is smaller than 65 degrees. Furthermore, preferably, the angle ß is greater than 0 degrees, preferably it is greater than 15 degrees and most preferably it is greater than 30 degrees.

More preferably, the angle ß is substantially 30 degrees, 45 degrees or 60 degrees. More preferably, the angle ß deviates only slightly from one of the aforementioned three values of the angle, wherein preferably slightly below a range should be understood as of preferably +/−7.5 degrees, in particular of +/−5 degrees and most preferably of +/−2.5 degrees. In particular, by the described selection of the angle ß out of said range, a particularly stable torque transmission region can be achieved, and thus a uniform torque introduction from the machine tool to the tool device can be achieved. The transmittable torque increases in particular with a decreasing angle ß. Preferably, for configurations which desire a high transmittable torque, the angle ß is selected from a range of 0 degree <ß<30 degrees. In particular, the space requirements decrease with an increasing angle ß. Preferably, for configurations that desire a small space requirement, the angle ß is selected from a range from 60 degree <ß<90 degrees. In a particularly preferred embodiment, in which a large torque is particularly transmittable and a low space requirement is desired, the angle ß is essentially 60 degrees.

In a preferred embodiment, the tool device has an even number of driving area regions. Preferably, the tool device has 4 or more driving area regions, in particular it has 8 or more driving area regions, and most preferably it has 16 or more driving area regions. Further preferably, the tool device has 64 or less driving area regions, in particular it has 48 or less driving area regions and most preferably it has 32 or less driving area regions. Furthermore, preferably, the tool device has an odd number of driving area regions, and preferably it has even number of driving area regions. Preferably, the number of the driving area regions is a function of the size of the tool device. Further preferably, a tool device may also have larger numbers of driving area regions than those specified here. Here, a large tool device should be understood in particular as a tool device, which has essentially a diameter exceeding 50 mm or more. Further preferably, the tool device has a diameter of substantially 30 mm. In particular, by the even number of the driving area regions, the driving forces of the machine tool can be transmitted in pairs on the tool device. It has been found that a particularly durable and thus improved tool device can be achieved, in particular by this introduction in pairs of the driving forces on the tool device.

In a preferred embodiment, the driving area regions are substantially arranged in a star-like manner. Preferably, the driving area regions are substantially arranged in a star-like manner around the tool axis of rotation. Further preferably, by the driving area regions, a three-dimensional body is described, which being cut by a plane orthogonal to the tool axis of rotation has essentially the base area of a star-shaped polygon.

In the sense of the present invention, the term polygon should not only be understood to be the mathematically exact form having obtuse angled corners or acute angled corners, but it should also be understood as a form in which the corners are rounded.

More preferably, the star-like disposed driving area regions appear similar to a toothed shaft of a conventional shaft hub connection, wherein the shaft has a conical basic shape due to the double inclination of the driving area regions. In particular, by the star-shaped arrangement of the driving area regions it is possible to arrange a plurality of driving area regions in a small space and to transmit a large driving force from the machine tool securely to the tool device.

A series of tool devices according to the invention comprises at least two of said tool devices. In this case, such a tool device has in particular a reference plane. The reference plane is perpendicular to the tool axis of rotation. The reference plane has at least one reference diameter or another reference dimension of the driving area regions. In this case, a first distance Δ of a first surface of the cover surface section for the reference plane for different tool devices of a series lies between a first lower limit and a second upper limit.

In the sense of the invention, a reference plane should be understood as a plane whose position is determined in the axial direction of the tool axis of rotation, that it contains the same reference diameter for a first tool and at least one further tool of this series. In this case, the axial position of this reference plane in the axial direction may be different from at least a first and a second tool of this series, because of the double inclination of the driving area regions. By the reference plane, the axial position of the reference diameter for a tool device is particularly defined. This leads in particular in the axial direction to a fixed reference point for several tool devices of a common series. Figuratively speaking, this approach can be particularly understood that an imaginary ring (reference diameter, reference dimension) is threaded in the axial direction on the driving area region, and this defines a particular axial position, which may differ for different tool devices. In particular, by specifying a lower limit and an upper limit, it is possible to take account of unavoidable tolerances in the manufacture of the tool device. Preferably, these limits have been selected from a range of a few 10ths or of a few 100ths mm.

In a preferred embodiment of this series, the distance Δ for at least two different tool devices of the series is substantially constant. Preferably, constant should be understood in that the distance Δ of a first tool device and the at least one second tool device or the several second tool devices is at least within this limit. In particular, the fact that the distance Δ moves within a series of tools in a narrow tolerance band, it is possible that the tool devices of a series are positioned substantially equal in the axial direction, and thus a safe introduction of the torque can be ensured.

In a preferred embodiment of a series of at least two tool devices, at least two tool devices of the series have different average wall thickness t or $t_i$. In particular, by tool devices with different wall thicknesses, it is possible to make the tool device suitable to the load; because on the tools, which are intended for different uses, for example, sawing or grinding, act different forces, and these different forces can be taken into account, in particular by the different wall thicknesses.

In a preferred embodiment, a series comprises at least two tool devices, which have an encoding region, which is substantially equal arranged with respect to its position in regard to the tool axis of rotation and the driving areas. Further preferably, each tool device comprises such an encoding region and, preferably, each of these tools devices is characterized by at least one application parameter, such as in particular a preferred driving power. Further preferably, such an application parameter may take into consideration the type of tool, the type of manufacturer or other parameters of the machine tool, or preferably it may take into consideration the power necessary for driving the tool device. Preferably, the encoding region comprises at least one encoding device. Preferably, this encoding device is characteristic for at least one of these application parameters. In particular, by the described configuration of the encoding region, it is possible to keep different tools of a series for various areas of application; and thus to counter overloading the tool devices from the outset.

In a preferred embodiment of a series of at least two tool devices, at least a first tool device comprises a first encoding device. Preferably, this first encoding device is intended to cooperate with a first coding element, which is preferably arranged on a machine tool. Further preferably, at least one second tool device of the series comprises a second encoding device. Further preferably, the second encoding device is provided to cooperate with a second encoding element. Preferably, a first encoding element is arranged on a first machine tool, and more preferably the second encoding element is arranged on a second machine tool. Preferably, the encoding devices and the encoding elements are designed so that the first encoding element can cooperate with the first encoding device and the second encoding device. Preferably, the second encoding element is designed such that it does not cooperate with the first encoding device, but that it does cooperate with the second encoding device. In particular, by this configuration of the encoding devices, it is possible to restrict certain tools to specific machine tools. In this case, on the one hand, it can be achieved that in particular a tool device having an attachment region, which is provided for small driving forces, will not be received on a machine tool, which provides driving forces that can damage this attachment region of the tool device. On the other hand, it can be achieved that the tool device which require high driving forces or have a high torque can not be received on a machine tool, which is not set up for this purpose. Thus, damage to the machine tool can be prevented.

In a preferred embodiment of the series of at least two tool devices, the form of a basic area of at least one of, preferably of all of the encoding devices is selected from a group of shapes. Preferably, this group has at least one of the following elements:

a polygon with a plurality of corners, preferably 3, 4, 5, 6, 7, 8 or more corners,
  a circle,
  an ellipse,
  an arc with a variable radius or a constant radius or
  a combination of several of the mentioned forms.

In particular by the design of this encoding device, it can be adapted to the respective requirements on the tool device, and thus is an improved series of tool devices can be achieved.

In a preferred embodiment, a series of at least two tool devices comprises at least two tool devices, each one of these having encoding devices, wherein the encoding devices have the same geometric shape, but different sizes. Preferably, all tool devices comprise an encoding device having the same geometric shape, but at least partially different sizes.

In a preferred embodiment, a series of at least two tool devices comprises at least one tool device, in which the encoding device is designed as raised portion compared to a encoding reference plane. Preferably, an encoding reference plane should be understood as a plane perpendicular to the tool axis of rotation. Further preferably, the encoding reference plane is disposed substantially in the region of the cover surface section, or it coincides with the cover surface section. Further preferably, the series comprises a second tool device with a raised second encoding region. Preferably, at least one first extension of a encoding device is larger than the respective extension of the second encoding device. Preferably, the first tool device for the machine tools is provided with a high driving power, and further preferably the second tool device for the machine tools is provided with a low driving power. In this case, a high driving power of the first machine tool should be understood in that this driving power is larger than the driving power of the second machine tool. Preferably, the similar first extension on the first tool device is larger than the same extension of the encoding device on the second tool device. By this, high-performance tools can be reserved in particular for the machines, which are intended for professional use in industry and crafts enterprises (professional machines); and tool devices can be reserved for lower performance requirements, both on professional machines as well as on DIY (Do-it-yourself) machines, which are intended for use in the private sector. This makes it possible in particular to adapt the tool devices to the respective driving power, thus is improved tool devices can be achieved.

In a preferred embodiment of a series of at least two tool devices, at least one of the encoding devices is constructed as a recess. Preferably, all of the encoding devices of the series are constructed as recesses. Further preferably, the encoding devices are arranged in the region of an encoding reference plane. Preferably, at least an extension of an encoding device is larger than the respective extension of the other encoding device. In particular, a tool device, which is intended for a professional machine with a high driving power has a small encoding device. A second tool device of the same series, which is provided in particular for a DIY-machine, has opposite to the first encoding device a large encoding device. For this applies in particular that a professional machine has a higher driving power in regard to a DIY machine. The tool device dedicated to the DIY machine thus fits both on the professional machine as well as the DIY machine, while the professional tool can not be mounted on a DIY machine. This prevents that DIY machines are damaged by the tool devices that are designed for higher power ratings. In particular, the fact that the encoding device (recess) for the professional machine is smaller than the encoding device for the DIY-machine, particularly stable tool devices can be achieved for a large driving power.

In a preferred embodiment, a series of at least two tool devices comprises encoding regions which are arranged in the region of this cover surface section. Particularly, if these cover surface section are arranged in the region of an upper boundary plane, the encoding regions are can be particularly easy accessed, and therefore is an improved tool device can be achieved.

A method for manufacturing a tool device according to the invention comprises for the manufacturing of at least one driving area region a primary shaping process step, or a reshaping process step, or a generative process step. Preferably, the process for the manufacturing of at least one driving area region comprises a combination of several of the aforementioned process steps. The process steps for the manufacturing of at least one driving area region are selected from a group of process steps comprising at least the following manufacturing method:

a forging, a pressing, a rolling, an extruding, a folding, a deep drawing, a beading, a flanging, a straightening, a bending, a stretching, a compressing, a sintering, a casting, a layer by layer coating or the like.

Preferably, a method for the manufacturing of a tool contour of the tool device has a separating process step. Preferably, it is a thermally separating process step, preferably a mechanically separating process step or a combination of several of these process steps. Further preferably, the process steps the manufacturing of the tool are selected from a group comprising at least the following process steps:

a sawing, a grinding, a milling, a punching, a shearing, a particle beam cutting, an electron beam cutting, a laser cutting, a plasma cutting, a flame cutting, and a spark erosion cutting.

Preferably, the tool device, but at least the outer form is generated completely or predominantly by a generative manufacturing method.

In particular, by the aforementioned manufacturing method, it is possible to produce a particularly precise driving area region, and thus ensure a uniform introduction of the driving forces in the tool device.

The following figures show various features and embodiments of the invention and they are partially in a schematic form, wherein a combination of the individual features and the embodiments beyond the figures is also possible.

In a preferred embodiment, the tool device is received in such a way on output spindle of the machine tool that a small distance δ is obtained between an end face of the output spindle and an opposite surface of the tool device, when the tool device is received on the machine tool. Preferably, this distance is substantially equal in at least two points, lying symmetrically in regard to the tool axis of rotation, preferably at several points. Preferably, a small distance in this context should be understood as a distance δ, which is in a range which is preferably smaller than 5 mm, preferably smaller than 2.5 mm and more preferably smaller than 1.5 mm, and most preferably smaller than 0.8 mm, and further preferably larger than 0.0 mm, preferably larger than 0.25 mm, and more preferably be larger than 0.5 mm. By a small distance δ, it can be advantageously be achieved that the tool device, in particular in the case of an overloading, is supported on the output spindle, and that a tilting of the tool device is avoided or reduced. Further preferably, it can be achieved that in the insertion into the machine tool, the tool device can be received in not a particularly significant skew.

In a preferred embodiment, the tool device comprises stepped driving area regions, wherein the stepped driving area regions can be understood mutatis mutandis as driving area regions or tool driving area regions, and the explanations about these can be transferred to the stepped driving area regions. Preferably, stepped should be understood in the context of the invention in that this driving area regions are offset against the side wall of the tool device. In contrast to the non-recessed driving area regions, the driving area regions are preferably arranged not on or in the side wall of the tool device, but preferably offset to it, preferably radially offset, particularly radially spaced therefrom.

A connection device according to the invention is adapted for connecting a tool device with a machine tool, and in particular with hand guided machine tool. Preferably, a driving device of the machine tool drives the driving axis, in particular in a rotationally oscillating manner. The connection device comprises a first connection region and a second connection region. The first connection region is adapted for connecting the connection device to the machine tool, wherein the connection device can be connected to the machine tool in such a manner that the driving axis and a connection rotation axis substantially coincide. The second connection region is adapted for connecting the connection device with the tool device. Here, at least one of the connection regions has an attachment device, wherein the attachment device comprises at least two driving area region.

Furthermore, at least two driving area regions are provided, which are spaced apart from the connection axis of rotation, and which each has a plurality of surface points. The term "driving area" means an area that can at least partially be directly or indirectly in contact with the output device of the machine tool, to receive the torque from the machine tool. The term "surface point" means points on the surface of the driving surfaces in the sense with the given definition.

For the tangent planes to the surface points special geometric conditions apply. The tangent planes are, as shown in the geometry common practice, the layers that are formed perpendicular to the normal vectors of the surface points and contact the surface at the surface point. The term "normal vector" means a vector which is oriented in this surface point exactly perpendicular to the surface.

The tangent planes in the surface points are inclined in two directions. On the one hand, the tangent planes are inclined in regard to an axial plane, which includes the tool axis of rotation. Further, the tangential planes are inclined in regard to a radial plane which extends perpendicular to the tool axis of rotation.

The attachment device of the connection device and thus the driving areas or the driving area region of the connection device correspond therefore mutatis mutandis preferably to the driving area region of the tool device.

In a preferred embodiment, the connection device comprises a first connection region which is arranged rotationally symmetrical to the connection axis of rotation.

Preferably, the connection axis of rotation should be understood in the sense of the tool device as the tool axis of rotation. Preferably, the connection device is received with its attachment device on the machine tool in such a manner that the connection device can be driven around the connection axis of rotation, preferably in an oscillating manner or in a rotating manner. Further preferably, the connection axis of rotation and a first holding shaft coincide, and they are arranged parallel to one another or obliquely to one another. By such an arrangement of the connection region, a connection device having especially small imbalances can be achieved.

In a preferred embodiment, the second connection region is disposed rotationally asymmetrical to the connection axis of rotation. By such an arrangement, the connection region can be arranged, in particular at a small size, in a region of low stress.

In a preferred embodiment, the second connection region is arranged rotationally symmetrical to the connection axis of rotation. By such an arrangement, the tool device can be received at the connection device in such a manner that the axis of rotation of this tool means and the connecting axis of rotation are substantially coincident with each other and so small imbalances arise.

In a preferred embodiment, the connection device comprises a first holding device. Preferably, said the first holding device is adapted to cooperate with at least the first connection region and the machine tool. Preferably, the holding device comprises a screw device, more preferably a hook device, a snap fit device, or more preferably a latching device.

In particular by means of a holding device with a screw device, a particularly simple receiving of the connection device on the machine tool can be achieved.

In a preferred embodiment, the connection device comprises at least one second holding device. Preferably, the second holding device is adapted to cooperate with the second connection region and the tool device. Preferably, the tool device is received on the connection device in a material fit manner, preferably a form fit manner and particularly preferably a force fit manner or in a combination of the types listed. Preferably, the second holding device comprises a screw device, more preferably a hook device or a snap hook device, and particularly preferably a latching device.

In a preferred embodiment, the first holding device comprises a first holding shaft. In this case, the first holding shaft should be understood in the sense of the invention as the axis along which the direction of action of a holding force extend, which can be applied by this holding device. Preferably, for a screw device, the line of symmetry of it should be understood as the holding axis. Further, the second holding device comprises on second holding shaft, wherein preferably the second holding shaft, mutatis mutandis corresponds to the first holding shaft. Preferably, this first holding shaft and this second holding shaft are substantially parallel, in particular congruent to each other. Preferably, the connection rotation axis coincides with the first holding shaft. In the sense of the invention, congruent may be construed as coaxial. By such an arrangement of the holding device, it can be particularly achieved, that the connection device on the machine tool and the tool device at the connection device can be received particularly easy, especially in a single operation.

In a preferred embodiment, the first holding device comprises a first holding shaft and the second holding device comprises a second holding shaft. Preferably, the first holding shaft and second holding shaft are arranged askew, particularly skewed to each other. In the sense of the invention, askew can be understood in that the two holding shafts are not parallel to each other on the one hand and that they do not intersect the other in the space. By such an arrangement, a particularly stress tolerant design of the connection device can be achieved.

BRIEF DESCRIPTION OF THE DRAWINGS

Here, the following are showed:

FIG. 6 shows a plan view (FIG. 6a) and a side view (FIG. 6b) of a plurality of contiguously arranged driving area regions, these driving area regions being disposed circumferentially closed around the tool axis of rotation.

FIG. 9 shows a sectional view of the tool device with a tangent plane on a surface point of the driving region with the angle of inclination a.

FIG. 14 shows perspective views of differently curved driving area regions.

FIG. 25b, a solid body).

DETAILED DESCRIPTION

Figure 1:
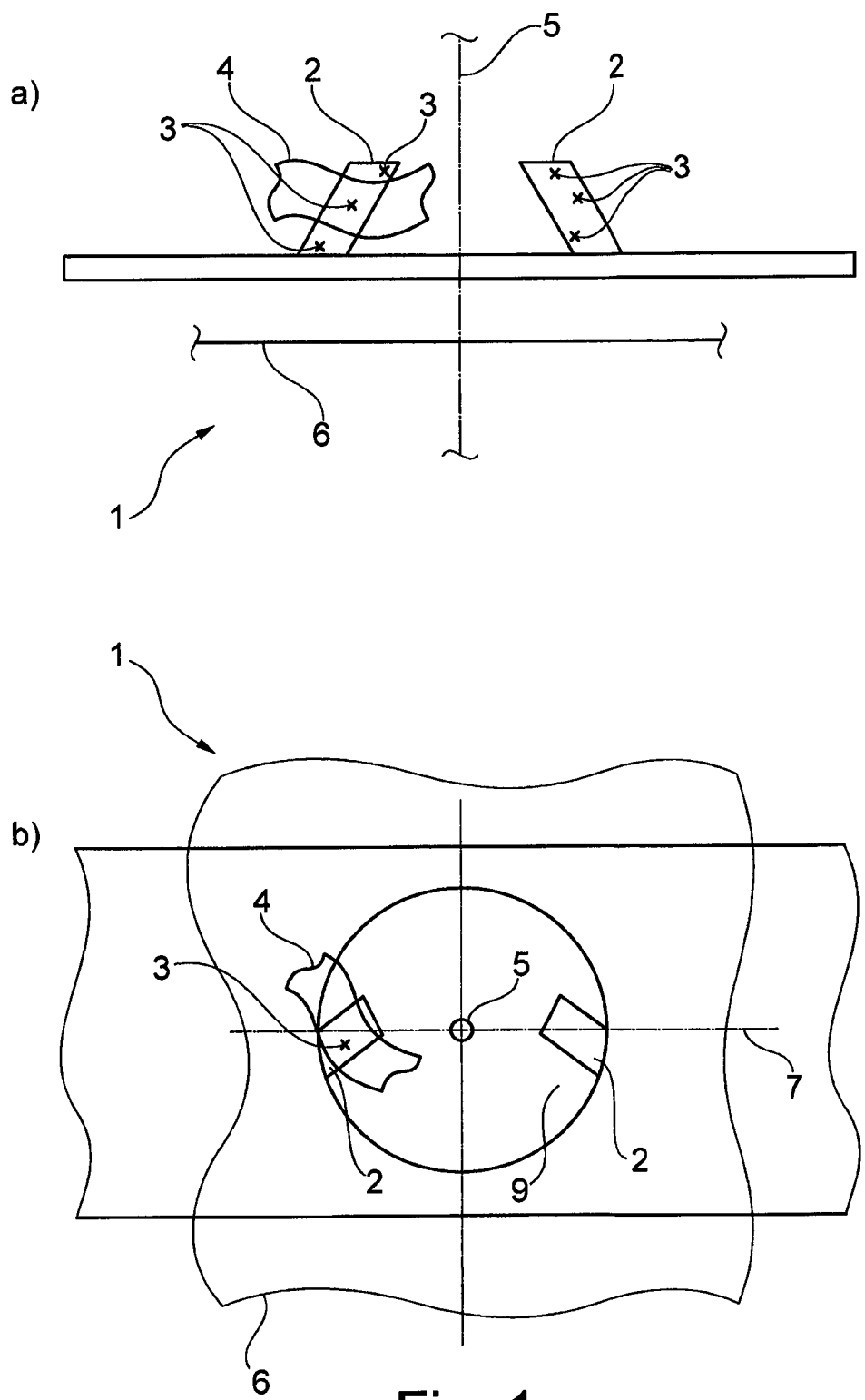
FIG. 1 shows a side view (FIG. 1a) and a plan view (FIG. 1b) of a tool device with two driving area regions.

The FIG. 1 shows two views (FIG. 1a front view, FIG. 1b plan view) of a tool device 1. This tool device has two driving area regions 2. Here, a driving area region 2 has several surface points 3. A tangent plane 4 can be assigned to each of these surface points 3 in the driving area regions 2. These tangent planes 4 are inclined in regard to a radial plane 6 and in regard an axial plane 7. Here, the radial plane 6 is arranged orthogonally to a tool axis of rotation 5 and an axial plane 7 encloses the tool axis of rotation 5a. The tool device 1 is provided for a rotationally oscillating driving of a hand guided tool device (not shown). If the tool device 1 is driven by a suitable machine tool then the tool device 1 is put into a rotating oscillating motion around the tool axis of rotation 5. By the dual inclination of the driving area region 2, it can be achieved a holding free from backlash of the tool device 1 in the machine tool. This is particularly advantageous for a sawing operation and a grinding operation or the like, since here varying loads act on the tool device 1 with respect to the tool axis of rotation 5, and a lost motion connection between the machine tool and the tool device 1 may result to the knocking out of the connection, and thus in particular it may result into a damaging of the tool device 1.

Figure 2:
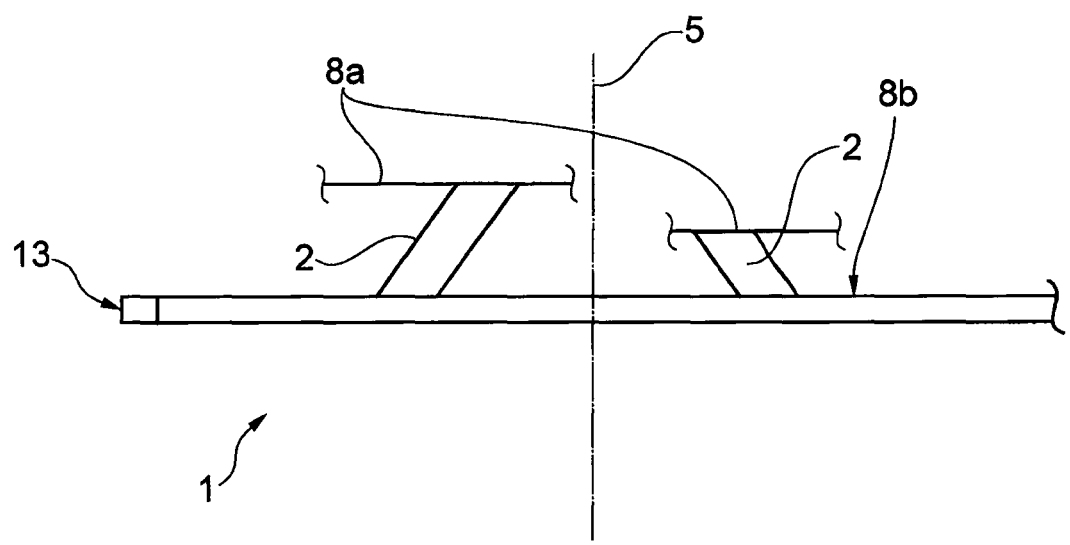
FIG. 2 shows a side view of several driving area regions, which extend in each case between an upper boundary plane and a lower boundary plane.

The FIG. 2 shows a view of the tool device 1, in which it can be seen that the driving area region 2 extends between each of an upper boundary planes 8a and a lower boundary planes 8b. These boundary planes 8 are preferably arranged orthogonally to the tool axis of rotation 5. In this case, in each case the driving area region 2 extends from the upper boundary plane 8a to the lower boundary plane 8b or vice versa. Preferably, here, the lower boundary plane 8b is located at the level of an operating region 13. Here, an operating region should be understood as an example as a saw tooth, as a saw blade or the like. Thereby, the lower boundary planes 8b is arranged substantially at the level of the operating region 13, a particularly deformation poor transmission of the driving forces of the driving area regions 2 on the operating region 13 is possible. By the different boundary planes 8, and thus by the different extensions of the driving area regions 2, a particularly good adaptability to the requirements of the tool device is provided, in particular with regard to the space requirements, to the backlash and to the torque transmission. In the present case, the lower boundary planes 8b coincides with a common lower boundary plane 8b. The upper boundary planes 8a do not coincide in this embodiment, resulting into driving area regions 2 of different heights.

Figure 3:
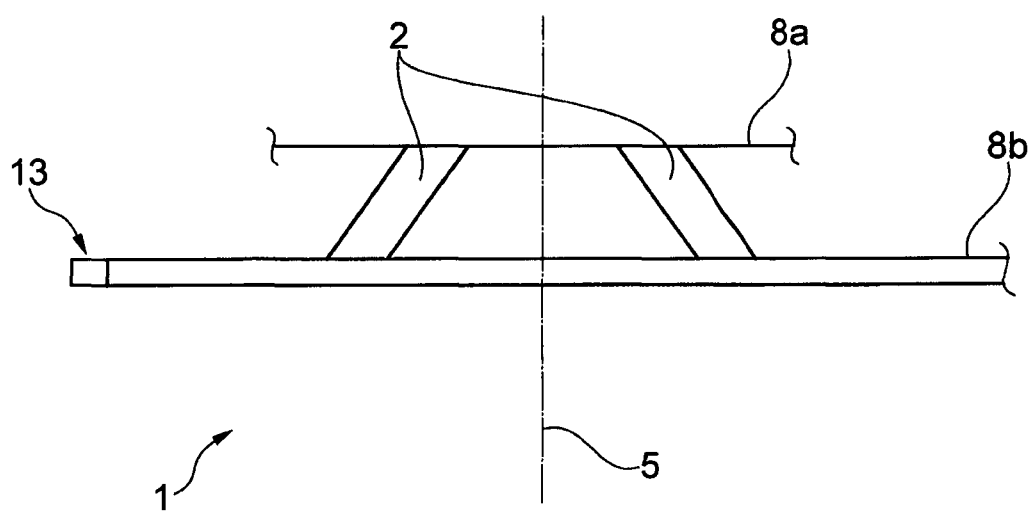
FIG. 3 shows a side view of several driving area regions, which extend between a common upper boundary plane and a common lower boundary plane.

The FIG. 3 shows a view of the tool device 1, in which all the driving area regions 2 are delimited by a single lower boundary plane 8b and a single upper boundary plane 8a. These boundary planes 8 are arranged perpendicular to the (fictional, geometric) tool axis of rotation 5. The lower boundary planes 8b is arranged substantially at the level of the operating region 13. In the direction of the tool axis of rotation 5, the upper boundary plane 8a is spaced away from the lower boundary plane 8b. If all of the driving area regions 2 extend between a single upper boundary plane 8a and a single lower boundary plane 8b, then a particularly simple manufacture of the tool device is possible, and further a particularly uniform transfer of the forces from the machine tool (not shown) on the tool device 1 is possible.

Figure 4:
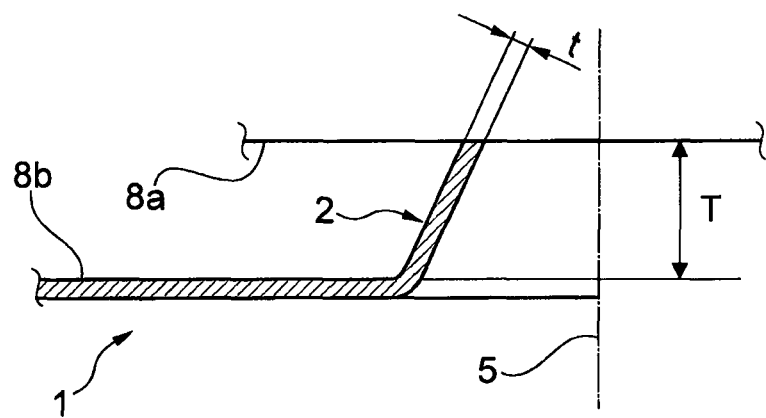
FIG. 4 shows a sectional view of a section of the tool device.

The FIG. 4 shows a part of the tool device 1 in a sectional view. The tool device comprises a (fictional, geometric) tool axis of rotation 5. The tool device 1 can be driven rotationally oscillating around the tool axis of rotation 5. The driving area region 2 is arranged spaced apart to the tool axis of rotation 5, and it extends in the direction of the tool axis of rotation 5 between the lower boundary plane 8b and the upper boundary plane 8a. The upper 8a boundary plane and the lower boundary plane 8b are spaced apart by the distance T. Here, the distance T is depending on the thickness t of the wall, which also has the driving area region 2. By this dependence, a particularly favorable relationship between the stiffness of the driving area regions and their size is achieved.

Figure 5:
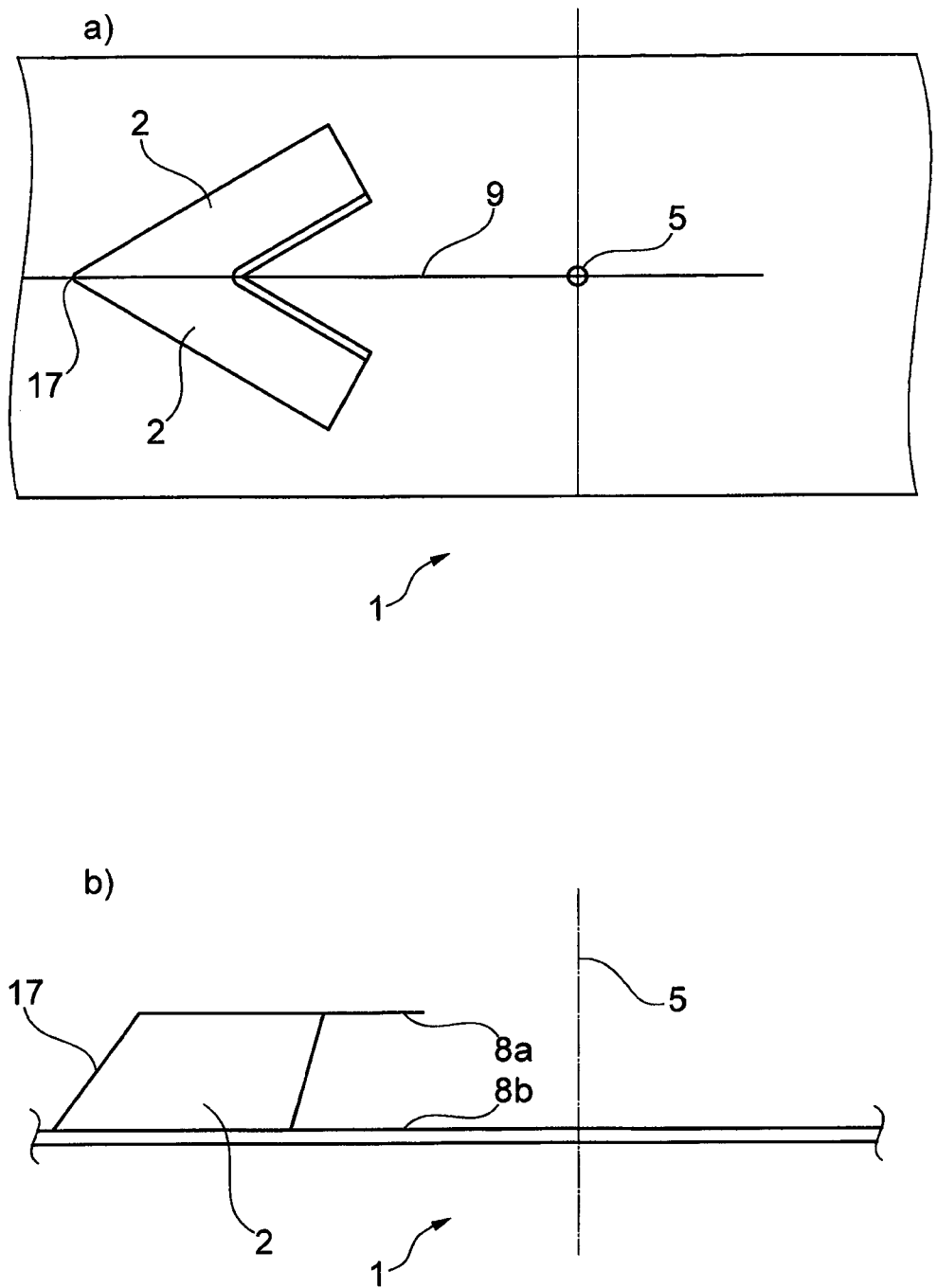
FIG. 5 shows a plan view (FIG. 5a) and a side view (FIG. 5b) of two contiguously arranged driving area regions.

The FIG. 5 shows different sectional views (FIG. 5a, top view; FIG. 5b front view) of the tool device 1. The tool device 1 has the tool axis of rotation 5. The driving area regions 2 are arranged symmetrically to a plane of symmetry 9. Here, the plane of symmetry 9 includes the tool axis of rotation 5. The driving area regions 2 are arranged contiguously and meet in a transition region 17. This transition region 17 is designed in dependence on the manufacturing process or on the stress in the force transmission to the tool device 1 and it may have a radius. The driving area regions 2 extend between the lower boundary plane 8b and the upper boundary plane 8a, and they are spaced apart from the tool axis of rotation 5. A symmetrical and in particular contiguous arrangement of the driving area regions 2 allows the design of a highly stable tool device 1, since the driving area regions 2 can support each other.

The FIG. 6 shows several partial views (FIG. 6a, top view; FIG. 6b front view) of the tool device 1. The tool device 1 has a tool axis of rotation 5, and a plurality of driving area regions 2, these driving area regions extend between the upper boundary plane 8a and the lower boundary plane 8b. The driving area regions 2 are each arranged contiguously to each other and form a radially closed side wall, which is circumferential around the tool axis of rotation 5. The driving area regions 2 are each inclined in regard to the radial plane 6 and in regard to the associated axial planes 7. By means of such a closed circumferential side wall, on the one hand, a particularly stable tool device can be achieved, and on the other hand, a particularly uniform driving force transmission from the machine tool (not shown) on the tool device 1 can be achieved.

Figure 7:
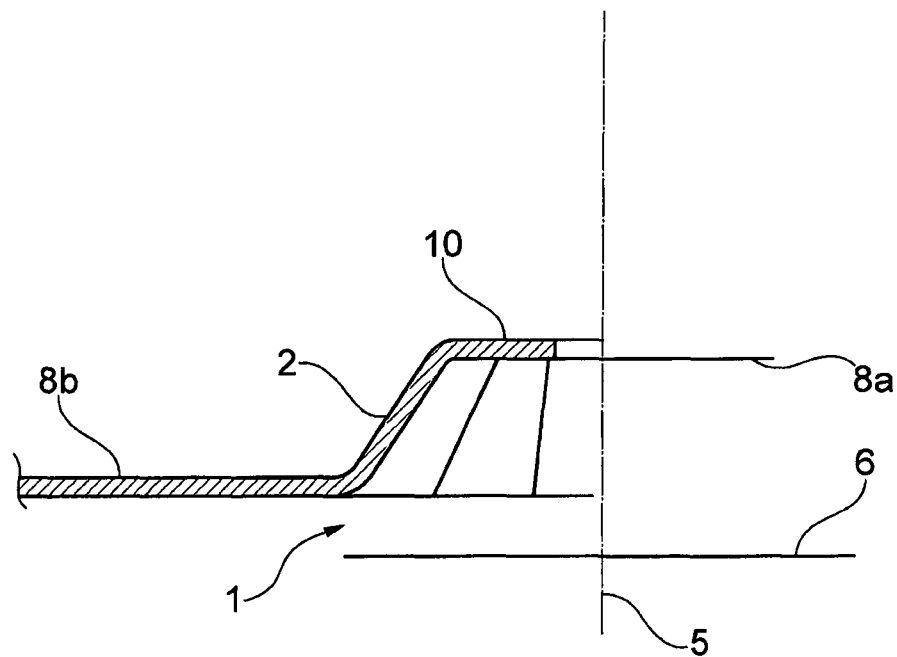
FIG. 7 is a sectional view of a section of a tool device with a cover area section.

The FIG. 7 shows a detail of the tool device 1 in a sectional view. The tool device 1 has the tool axis of rotation 5, the driving area region 2, and a cover area section 10. The tool device 1 can be driven around the tool axis of rotation in a rotating oscillating manner. The FIG. 7 shows that the driving area region 2 is inclined in regard to the radial plane 6.

The driving area region 2 extends between the upper boundary plane 8a and the lower boundary plane 8b. The driving area region 2 abuts substantially immediately to the cover area section 10 in the region of the upper boundary plane 8a. By means of a thus arranged cover area section 10, a further stabilization of the driving area regions 2 can be achieved, and for the same size of the driving area regions 2, larger driving forces can be transmitted as without the cover area section 10.

Figure 8:
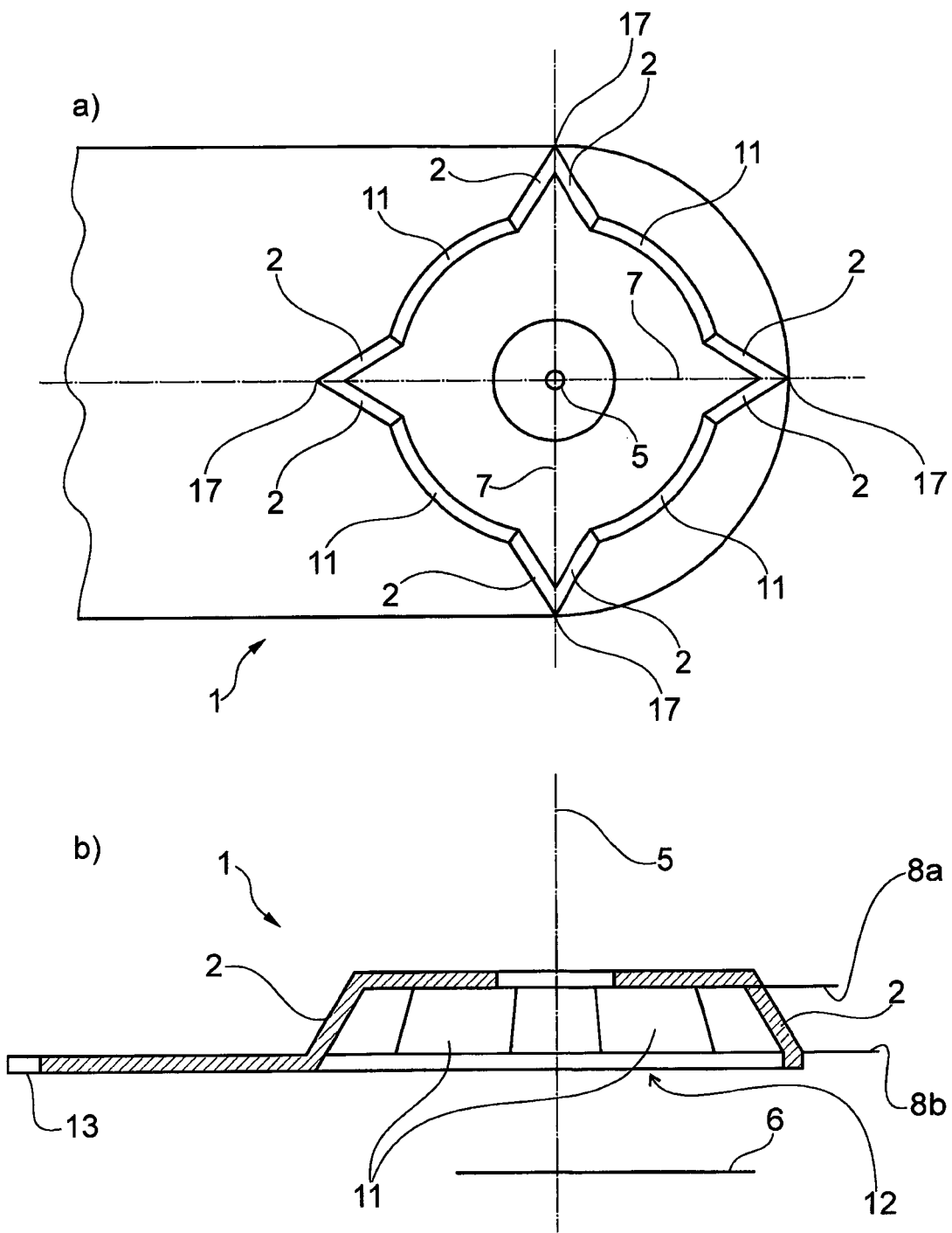
FIG. 8 shows a plan view (FIG. 8a) and a side view (FIG. 8b) of a tool device with an operating region, a connection region and an attachment region.

The FIG. 8 shows several partial views (FIG. 8a plan view; FIG. 8b front view) of the tool device 1. This tool device 1 has the (fictional, geometric) tool axis of rotation 5, a plurality of driving area regions 2, and the cover area section 10. The operating region 13 of the tool device 1 is intended to act on a work piece or on a work piece arrangement (not shown). In each case, two driving area regions 2 are positioned abutting one another and are connected with a further pair of driving area regions 2 by means of a connection region 11. The driving area regions 2 are arranged with rotational symmetry and they extend in the direction of the tool axis of rotation 5 between the upper boundary plane 8a and the lower boundary plane 8b. The driving area regions 2 are inclined in regard to the radial plane 6 and in regard to the assigned axial planes 7. By the connection regions 11, the driving area regions 2 form the closed side wall, which is circumferential around the tool axis of rotation 5. By means of the illustrated rotationally symmetrical arrangement of the driving area regions 2, the tool device 1 can be offset in the machine tool (not shown), provided of an appropriate design of these, so that the tool device can machine a work piece or a work piece arrangement (not shown), which is even difficult to access.

Figure 9:
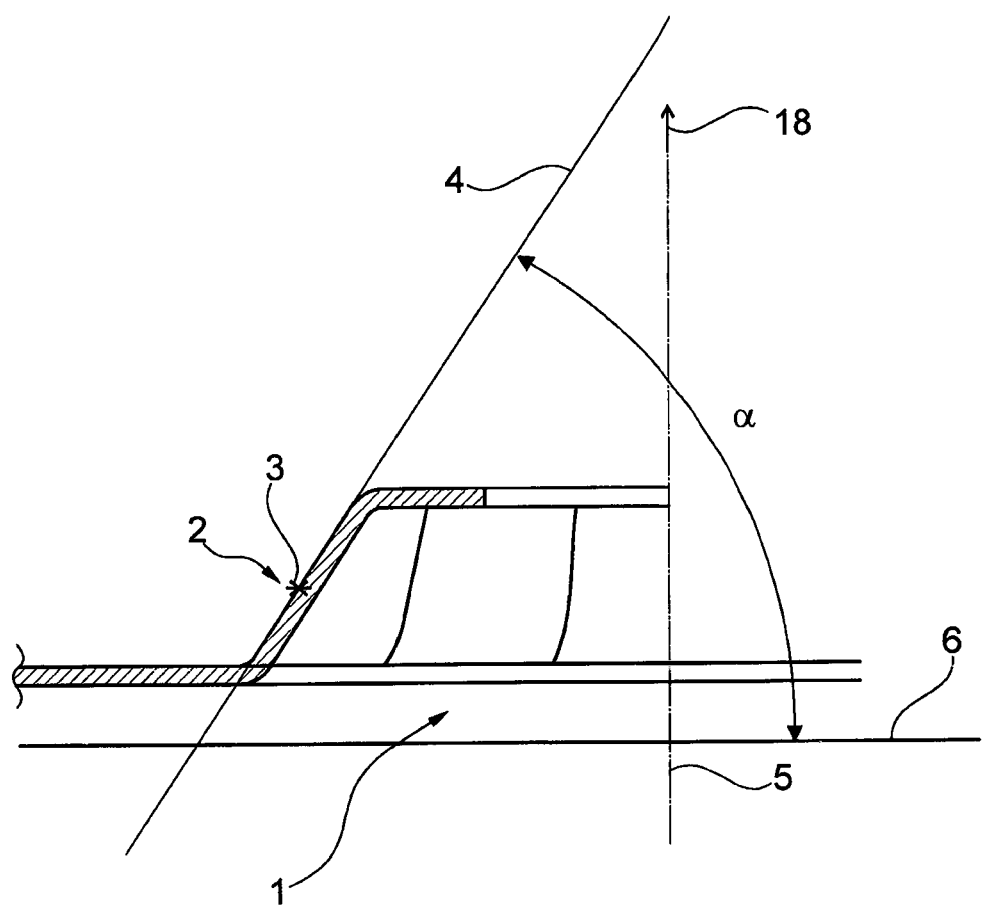

The FIG. 9 shows a detail of the tool device 1 in a sectional view. The tool device 1 has the tool axis of rotation 5 and the driving area region 2. This driving area region 2 has several surface points 3. To each of these surface points 3, a tangent plane 4 can be assigned. The radial plane 6 is arranged orthogonal to the tool axis of rotation 5. The radial plane 6 includes an acute angle α with the tangent plane 4. By this angle α, and thus by the inclination of the tangent plane 4 against the radial plane 6, it is particularly easy to receive the tool device 1 without play on the machine tool, especially when the tool device 1 is held on the machine tool (not shown) with a clamping force 18 in the direction of the tool axis of rotation.

Figure 10:
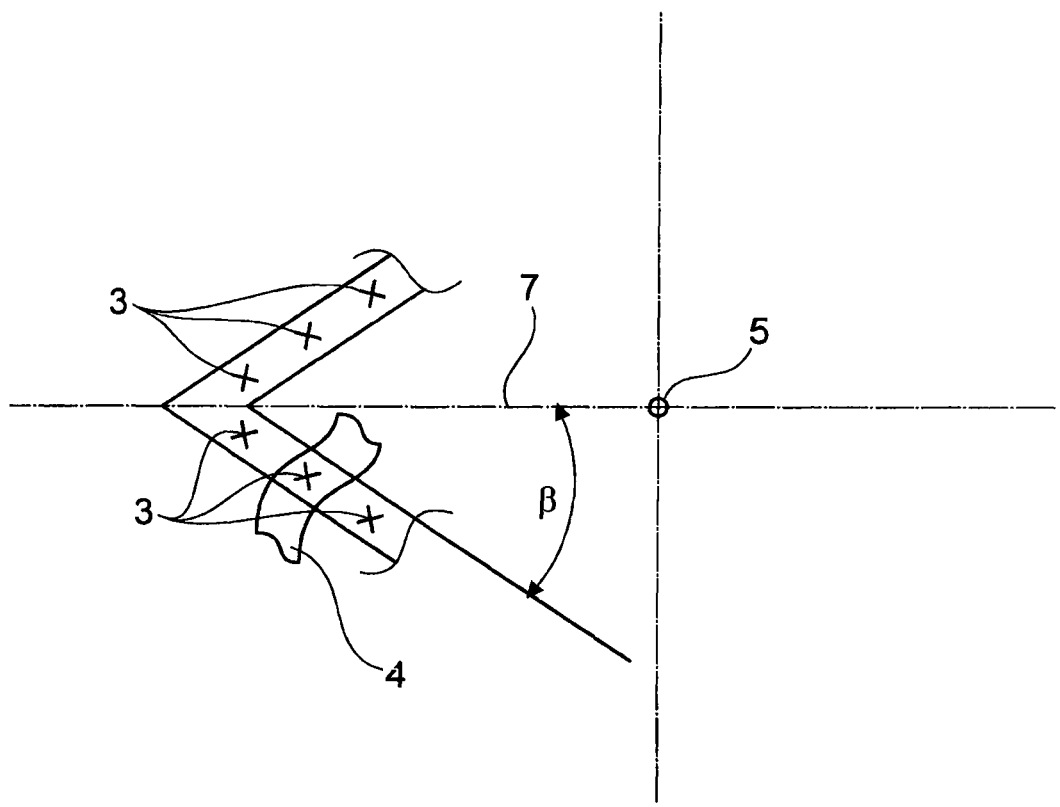
FIG. 10 shows a plan view of a portion of the tool device having a tangent plane on a surface point of the driving region and the inclination angle ß.

The FIG. 10 shows a detail of the tool device 1 in plan view, wherein the tool axis of rotation 5 can be seen merely as a point. The axial plane 7 includes the tool axis of rotation 5 and it can be seen as a straight line in the FIG. 10. To the surface point 3 of the driving area region 2, a tangent plane 4 can be assigned. The driving area regions 2 are positioned abutting one another and are spaced apart radially from the tool axis of rotation 5. The tangent plane 4 includes an acute angle ß with the axial plane 7. By the angle ß in conjunction with the angle α, it is possible that the tool device 1 is centered in regard to the machine tool (not shown) when it is received in the machine tool.

Figure 11:
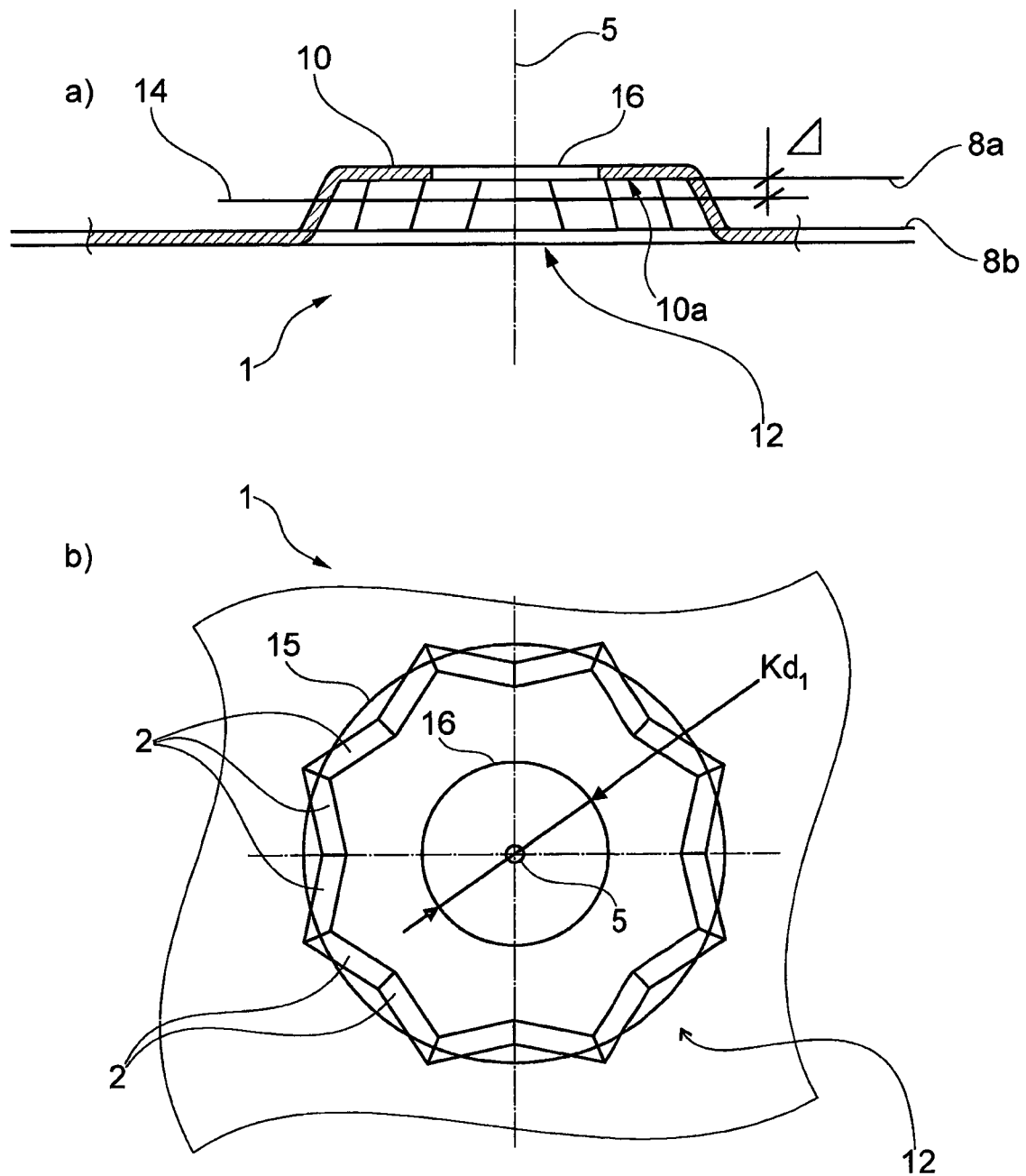
FIG. 11 shows a sectional view (FIG. 11a) and a plan view (FIG. 11b) of a tool device with a reference plane and an encoding device.

The FIG. 11 shows multiple views (FIG. 11a cross-sectional view; FIG. 11b top view) of the tool device 1. The tool device 1 has the tool axis of rotation 5 and a plurality of driving area regions 2, which are arranged radially spaced apart therefrom. The driving area regions 2 are substantially planar. Further, these driving area regions 2 are arranged contiguously, forming a closed side wall, which is circumferential around the tool axis of rotation. The driving area regions 2 extend toward the tool axis of rotation 5 between the upper boundary plane 8a and the lower boundary plane 8b. In the region of the upper boundary plane 8a, the cover area section 10 is arranged. The cover area section 10 preferably has an encoding device 16. The encoding device 16 is preferably arranged as a circular recess in the tool axis of rotation. This circular recess has a first encoding diameter Kd_1. Other tool devices (not shown) of the same series, which, however, are provided for other drive ratings, may have further coding diameters (Kd_2, and so on) that are different from the Kd_1. The Kd_1 indicates for example a tool device 1 for a professional use, the Kd_2 (not shown) indicates a tool device for the do-it-yourself (DIY) use. Further, a lower section of the cover area section 10a has a distance Δ to the reference plane 14. The position of the reference plane 14 is defined in such a way that it contains a reference diameter 15 (nominal outer diameter, nominal middle diameter, nominal inner diameter or the like). For different tool device of a series, in particular at different wall thicknesses t or also due to unavoidable tolerances in the manufacture of the tool device, different positions results based on the position in the direction of the tool axis of rotation 5, for nominally the same reference diameter 15. Starting from this position of the reference plane 14 in the direction of the tool axis of rotation 5, the tool device comprises a substantially constant distance Δ from the lower cover area section 10a to this reference plane 14. Thereby that a plurality of tool devices of a series have a substantially constant distance Δ between the lower cover area section 10a and the reference plane 14, a particular simple and safe accommodating is provided for the different tool devices 1 on the machine tool (not shown).

Figure 12:
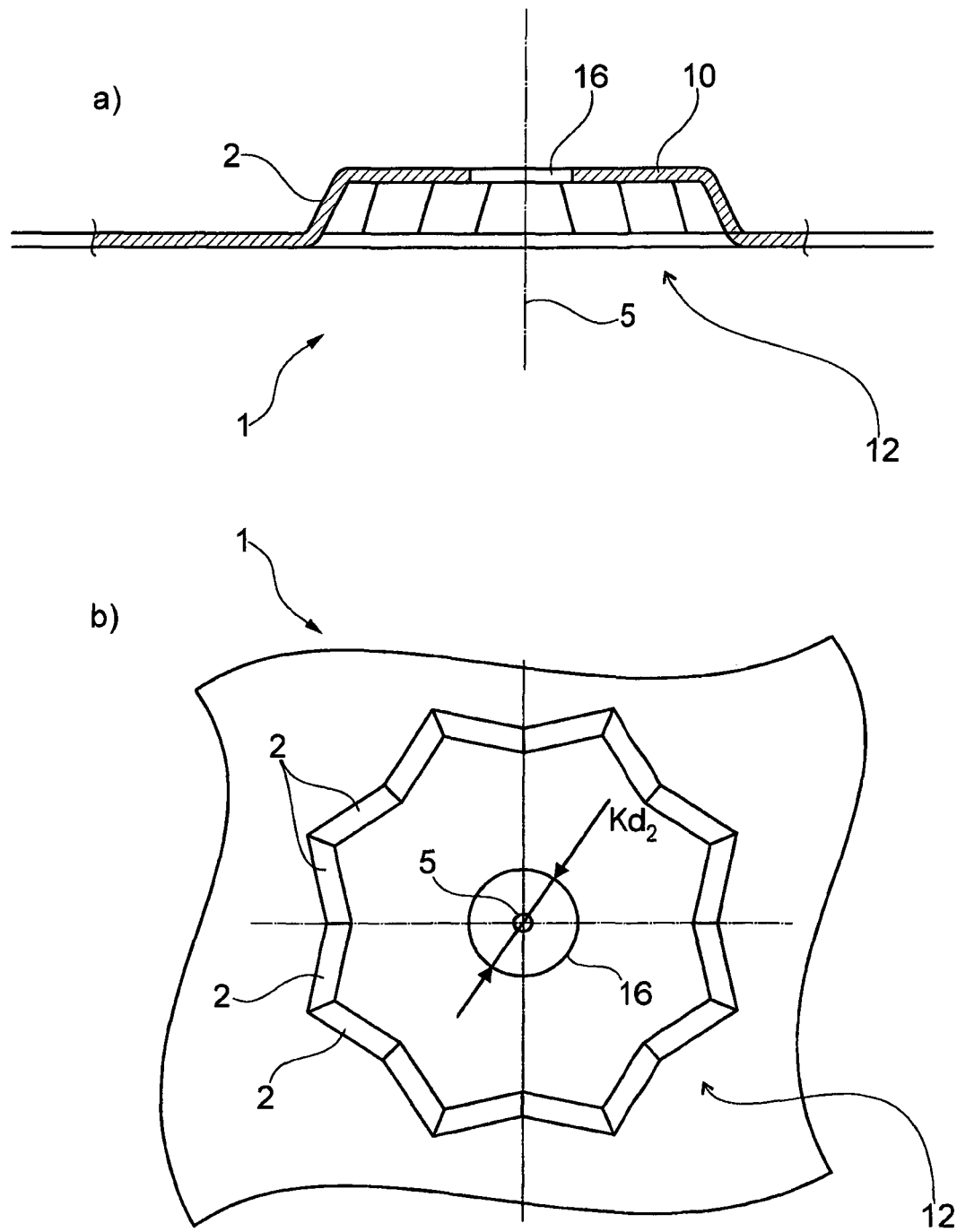
FIG. 12 shows a sectional view (FIG. 12a) and a plan view (FIG. 12b) of a tool device of the same series, as illustrated in the FIG. 11, but with a different encoding device.

The FIG. 12 shows the same views of a tool device 1 as well as the FIG. 11. However, in the FIG. 12 another tool device 1 of the some series of tool device 1 is shown, which has been shown in the FIG. 11. Therefore, below are mainly discussed the differences between the tool device 1, which is shown in the FIG. 1, and the tool device 1, which is shown in the FIG. 12. In the cover area section 10 an encoding device 16 is arranged as a recess in the tool axis of rotation 5. This encoding device 16 includes an encoding diameter Kd_2, while the encoding diameter Kd_2 is smaller than the encoding diameter Kd_1 (FIG. 11). The encoding device 16 is configured to cooperate with a second encoding element (not shown), which is arranged on the machine tool (not shown). By such a design of the encoding means 16 in a series of tool devices, it is possible to reserve specific tool devices 1 for certain machine tools, and thus to enable a safe operation.

Figure 13:
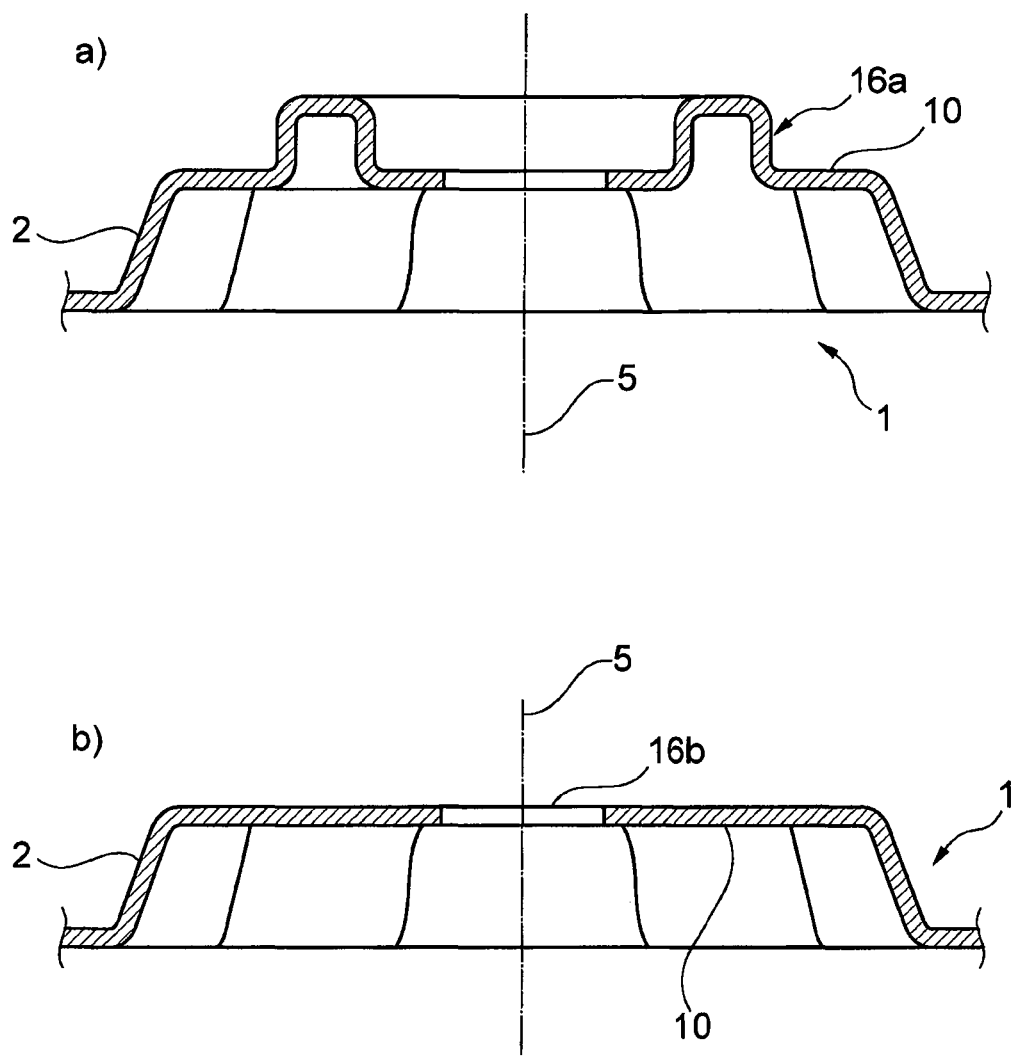
FIG. 13 shows two sectional views of different types of encoding devices of the tool device.

The FIG. 13 shows various illustrations of the different tool devices 1, particularly with regard to the encoding device 16. The FIG. 13a shows a detail of a tool device 1 with a raised encoding device 16a. The FIG. 13b shows a tool device 1 with a encoding device 16b which is designed as a recess. For both encoding devices 16a/b it is common that they are arranged in the region of the cover area section 10 of the tool device 1. The tool device 1 comprises a plurality of driving area regions 2, which are arranged spaced apart from the tool axis of rotation 5.

The FIG. 14 shows different sections of a driving area region 2 of the tool device. Not shown is a planar driving area region, such a driving area region is also preferably possible. The FIG. 14a shows a unidirectionally curved section of the driving area region 2. This section of the driving area region 2 can be described by the straight lines a and by the curved grid lines $b_I$. The curved grid lines $b_I$ have a constant radius of curvature $R_I$. Such a driving area region 2 corresponds to, in sections, a cylinder jacket surface, as far as several different radii of curvature $R_I$ are provided, it corresponds to a conical surface (not shown). In this case, the size of the radius of curvature $R_I$ is selected in such a way that the driving area region 2 changes in sections during the transmission of the driving forces to a plane or that it adapts to the opposite surface (not shown) which cooperates with it to transmit the driving forces. The FIG. 14b shows a section of the driving area region 2 with a bidirectional curvature. This section of the driving area region 2 can be described by the curved grid lines $b_I$ and by the curved grid lines $b_{II}$. The grid lines $b_I$ have the constant radius of curvature $R_I$ and the grid lines $b_{II}$ have the constant radius of curvature $R_{II}$. Such a driving area region 2 corresponds to, for the special case that the first radius of curvature $R_I$ and the second radius of curvature $R_{II}$ are of the same size, a spherical surface. In the FIG. 14b a driving area region 2 with different radii of curvature $R_I$ and $R_{II}$ are shown. In this case, the size of the radii of curvature $R_I$ and $R_{II}$ can be selected such that the driving area region 2 at least partially changes during the transmission of the driving forces to a plane or that it adapts it to the counter surface (not shown) which cooperates with it to transmit the driving forces. The FIG. 14c shows a section of one driving area region 2 with the bidirectional curvature. This section of the drive surface area 2 can be described by the grid lines $b_I$ having a constant radius of curvature $R_I$ and by the grid lines $b_{Ia}$ having a variable radius of curvature $R_{Ia}$. In such a driving area region 2, also all the grid lines can have a variable radius of curvature (not shown). The size of the radii of curvature $R_{Ia}$ and $R_{II}$ can be selected in such a way that the driving area region 2 changes during the transmission of the driving forces in sections to a plane or that it adapts it to the counter surface (not shown) which cooperates with it to transmit the driving forces. In the FIG. 14, a concave curved driving area region 2 is shown, the expressed considerations can be transferred to a convex curved driving area region, accordingly.

Figure 15:
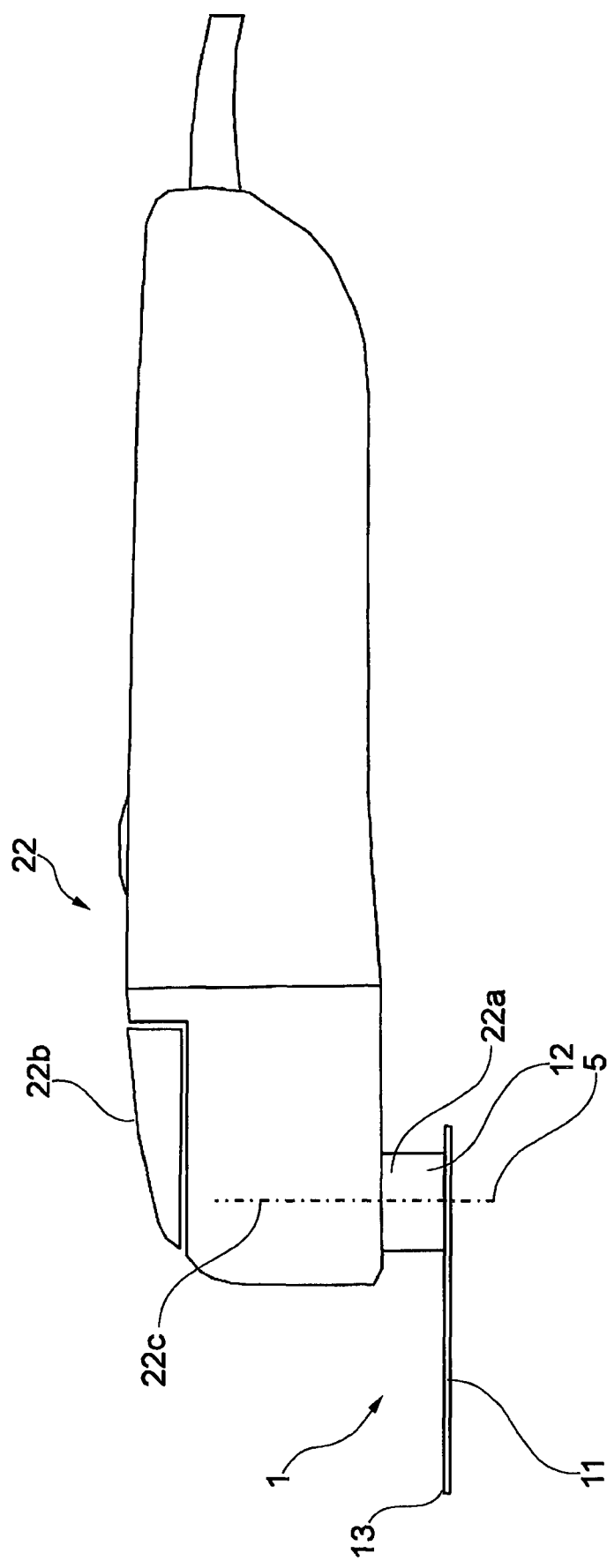
FIG. 15 shows a side view of a machine tool with a tool device.

The FIG. 15 shows a tool device 1 which is accommodated in a machine tool 22. The tool device 1 comprises an attachment device 12, by which it is connected to the machine tool 22. The machine tool 22 has an output spindle 22a, which introduces the driving forces into the tool device 1, in particular into its attachment device 12. The output spindle 22a moves around the machine tool axis of rotation 22c, in particular rotationally oscillating, thereby also the tool device 1 is brought in a similar motion. The tool device 1 has an operating region 13, which is adapted to act on a work piece or a work piece arrangement (not shown). The driving forces of the machine tool 22 are transmitted to the operating region 13 by the tool connection region 11 of the attachment device 12. The machine tool 22 has an operating lever 22b, which is adapted to permit a change of the tool device 1.

Figure 16:
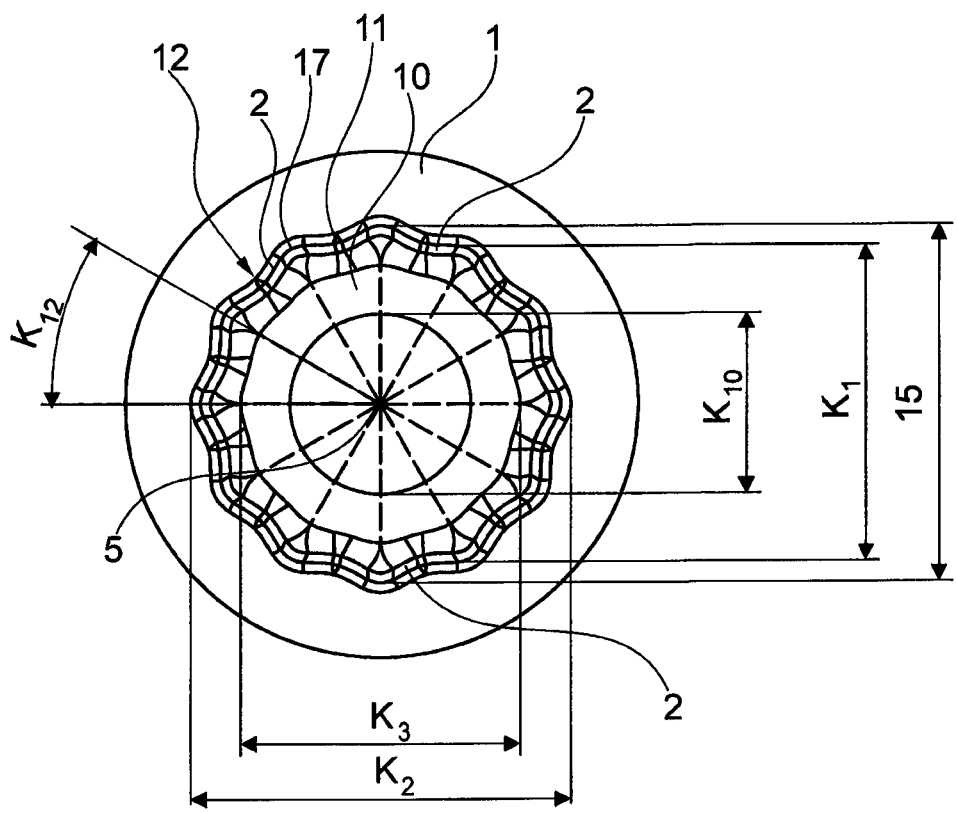
FIG. 16 shows a plan view of a region of the tool device.
Figure 17:
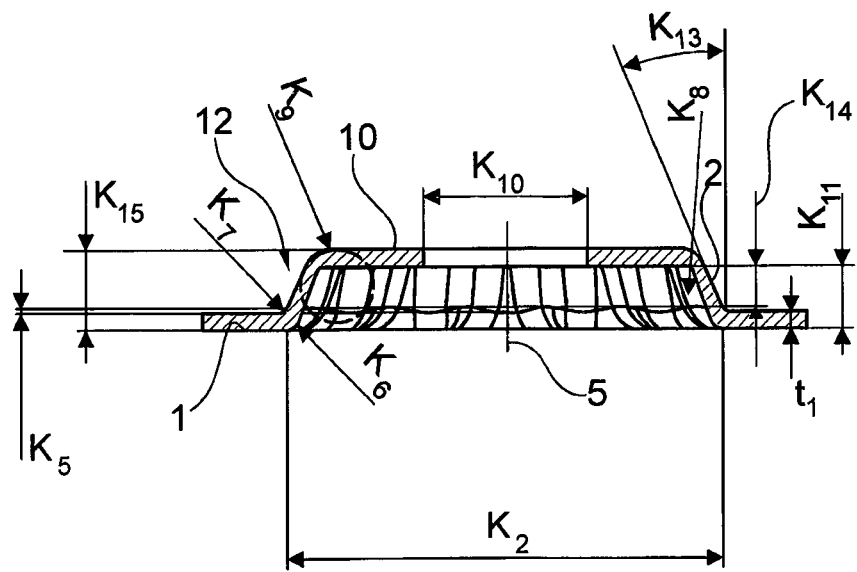
FIG. 17 shows a sectional view of a region of the tool device.

The FIG. 16 and the FIG. 17 show a tool device 1 in different views. The FIG. 16 shows a plan view and the FIG. 17 shows a sectional view of the tool device 1. The shown attachment device 12 of the tool device 1 is shown in the FIGS. 16 and 17 as a star-shaped polygon with rounded corners (connection regions 11). Here, the below discussed interrelationships can be applied least mutatis mutandis to other forms of such an attachment device 12.

In the plan view, FIG. 16, the rounded corners (connection regions 11) of the polygon can be seen. A so-called arm of the polygon is formed by two the driving area regions 2 and by the connection region 11. The individual arms are offset by an equidistant angle k12 to each other. Preferably, the, preferably equidistant, angle k12 results from the relationship: Full circle/(number of arms)=k12; for the present case 360 degrees/12=30 degrees. Preferably, by the equidistant angle k12, it is possible to accommodate the tool device 1 in different rotational positions in the machine tool. In present case, the tool device (not shown) can be offset in discrete steps of 30 degrees in regard to the machine tool.

The tool device 1 has in its cover area section 10 a, preferably circular, recess with a diameter k10. Further preferably, for this recess, forms are also possible differing from the circular shape.

Preferably, this recess has a substantially circular shape and it may have additionally recesses, preferably polygonal recesses or preferably spline-like recesses, which extend starting from the circular recess, preferably extending radially outward. Preferably, by these recesses, a star-like polygon is obtained having preferably circular sections. Particularly advantageously, such recesses may be used for tool devices, which are intended particularly for high loads, especially in diving saw blades or the like.

Further preferably, the diameter k10 corresponds to one of the diameters kd_1 or kd_2 for the tool devices of a series of at least two tools. This recess in the cover area section 10 is preferably adapted such that the tool devices 1 is held on the machine tool. Preferably, this recess should be understood as a through-recess/through-hole of a holding device (not shown), in particular of a screw device. The choice of the diameter k10 can depend on various parameters, preferably om the dimension of the holding device (not shown) of the machine tool. This holding device is particularly dimensioned in such a way that the tool device 1 is held securely on the machine tool.

The diameters k2 and k3 describe the outer diameters of the attachment device. In a preferred embodiment, the outer diameter of k2 is preferably selected from a range between 30 mm and 36 mm, preferably from 32 mm to 34 mm, particularly preferred the outer diameter k2 is substantially 33.35 mm (+/−0.1 mm).

In a preferred embodiment, the outer diameter k3 is preferably selected from a range between 22 mm and 27 mm, preferably from 24 mm to 26 mm, particularly preferably the outer diameter k3 is substantially 25 mm (+/−0.1 mm).

The distance k1 defines the distance of the two driving area regions 2, which are in this view parallel to each other (in a spatial view, the driving area regions 2 are inclined to each other). Compared with a screw head (for example, a hexagon or square) the distance k1 corresponds to a key width.

In a preferred embodiment, this key width k1 is preferably selected from a range between 26 mm and 30 mm, preferably from a range between 27 mm and 29 mm, more preferably, the key length is substantially 28.4 mm (+/−0.1 mm).

The diameter 15 indicates a reference diameter for the attachment device 12 of the tool device 1. In a preferred embodiment, the reference diameter 15 is preferably selected from a range between 31 mm and 33 mm, preferably from a range between 31.5 mm and 32.5 mm, and particularly preferably the reference diameter 15 is substantially 32 mm (+/−0.1 mm). Here, the reference diameter 15 is further preferably characterized in that the at least two different tool devices of a series of tools—seen in the direction of the tool axis of rotation 5—are substantially at the same level (+/−0.1 mm).

In the sectional view (FIG. 17), in particular the cross-sectional area of the attachment device 12 is particularly well recognizable. In a preferred embodiment, the tool device 1 has in the region of its attachment means 12 a, preferably substantially constant, wall thickness t1. More preferably, this wall thickness t1 is selected from a range between 0.75 mm and 1.75 mm, preferably it is selected from a range of 1 mm to 1.5 mm, and more preferably the wall thickness t1 corresponds to substantially 1.25 mm (+/−0.1 mm).

It has been found that especially a long service life for the tool device 1 can be achieved if certain transitions are rounded at the attachment device 12 of the tool device 1 (preferably, the radii: k6, k7, k8, k9).

In a preferred embodiment, at least one of the radii k6, k7, k8, and k9, preferably several of them, more preferably all of them are oriented on the wall thickness t1. Here, preferably from a larger wall thickness t1 follows an enlargement of these radii, preferably at least of the radii k7 and k9.

In a preferred embodiment (wall thickness t1=1.25 mm), the radius k6 is preferably selected from a range between 1 mm and 2.5 mm, preferably it is selected from a range between 1.5 mm and 2.1 mm, and particularly preferably the radius k6 is substantially 1.8 mm (+/−0.1 mm).

In a preferred embodiment (t1=1.25 mm), the radius k7 is selected from a range between 0.5 mm and 1.5 mm, preferably it is selected from a range between 0.8 mm and 1.2 mm, and particularly preferably the radius k7 is substantially 1 mm (mm+/−0.1).

In a preferred embodiment (t1=1.25 mm), the radius k8 is selected from a range between 0.2 mm and 0.6 mm, preferably it is selected from a range between 0.3 mm and 1.5 mm, and particularly preferably the radius k8 is substantially 0.4 mm (+/−0.05 mm).

In a preferred embodiment (t1=1.25 mm), the radius k9 is selected from a range between 2 mm and 3.5 mm, preferably it is selected from a range between 2.4 mm and 3 mm, and particularly preferably the radius k9 is substantially 2.7 mm (+/−0.1 mm).

The driving area regions 2 are inclined in the illustration of the FIG. 17 by the angle k13 in regard to an imaginary vertical line (parallel to the tool axis of rotation 5). In a preferred embodiment, this angle is selected from a range between 10 degrees and 30 degrees, preferably it is selected from a range between 17.5 degrees and 22.5 degrees, and more preferably the angle k13 is substantially 20 degrees (+/−0.5 degrees).

Further preferably, the other dimensions of the tool device depend on the wall thickness t1, more preferably at least the radii k6, k7, k8, and k9, wherein a larger wall thickness t1 tends to lead to larger radii k6, k7, k8, and k9, preferably at least to larger radii k9 and k6.

The diameter k2 preferably indicates the region of the driving area regions 2, from which it extends in a straight line. After this rectilinear extension, the driving area regions extend, preferably into the radius k9, and then into the cover area section 10.

Preferably, the measure k5 and the radius k7 are interdependent. More preferably, the measure k5 is selected from a range between 0.1 mm and 1 mm, preferably it is selected from a range between 0.3 mm and 0.7 mm, and particularly preferably the measure k5 is substantially 0.5 mm (+/−0.1 mm).

The radius k6 is preferably facing the radius k7 and it is larger than this. Also the radius k9 and the radius k8 are facing each other preferably, more preferably, the radius k8 is smaller than the radius k9.

In a preferred embodiment, the driving area regions 2 extend at a level (the direction is parallel to the tool axis of rotation) at least for the measure k14 substantially in straight line. Here, a straight line according to the invention should be understood in that it has no significant curvature, preferably standing in the unloaded condition, more preferably in a loaded condition. Preferably, the measure k14 is selected from a range between 1 mm and 3.5 mm, preferably it is selected from a range between 1.5 mm and 2.5 mm, and particularly preferred the dimension k14 is substantially 2 mm (+/−0.25 mm). Preferably, the measure k14 should be understood as the shortest linear course of the driving area regions 2.

The recess in the cover area section, which is preferably adapted to cooperate with the holding device (not shown) of the machine tool (not shown) has the diameter k10. The recess with the diameter k10 is not necessarily a circular recess as shown in the FIG. 16 and the FIG. 17, but this recess may, independently from the remaining appearance of the tool device 1, also have a different shape (polygon or the like).

In a preferred embodiment, the attachment region 12 has a depth k11, more preferably, the depth k11 is selected from a range between 3.5 mm and 6 mm, preferably it is selected from a range between 4.5 mm and 5 mm, and particularly preferably the depth k11 is substantially 4.7 mm (+0.15 mm).

In a preferred embodiment, the attachment region 12 has a height k15, further preferably the height k15 is selected from a range between 4.5 mm and 7.5 mm, preferably it is selected from a range between 5.5 mm and 6.5 mm, and more preferably the height k15 is substantially 6 mm (+/−0.2 mm).

Figure 18:
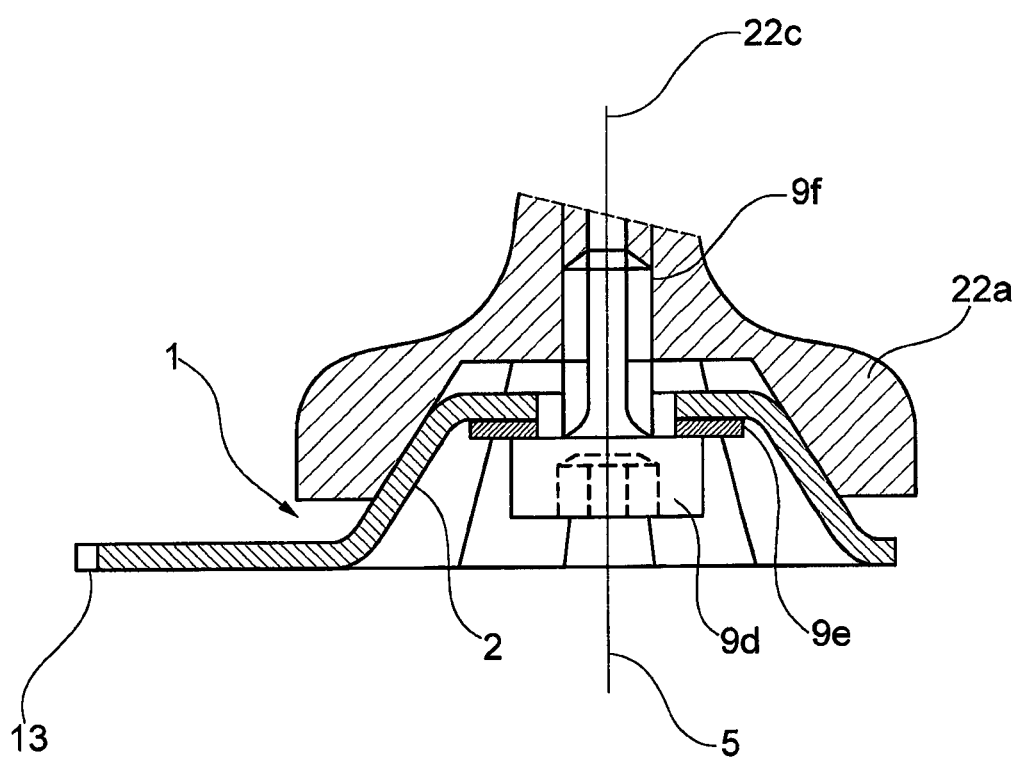
FIG. 18 shows a sectional view of a region of the output spindle and the tool device, which is accommodated in the machine tool.

The FIG. 18 shows a tool device 1, which by means of a screw device (fixing screw 9d, washer 9e, nut member 9f) is attached to the output spindle 22a of the machine tool. The tool device 1 has an operating region 13 to act on a work piece or on a work piece arrangement. From the tool driving area region 2, the driving forces are transmitted to the operating region 13. In this case, the tool device 1 is held by means of the fastening screw 9d, which exerts its force action by the washer 9e to the tool device 1 on of the machine tool. The transmission of the driving forces from the machine tool to the tool device 1 is achieved substantially by the form fit engagement of the driving area region 2 in the counter surfaces in the output spindle 22a. The output spindle 22a is rotationally driven by the oscillating machine tool rotation axis 22c, and transmits this motion to the tool device 1, so that this moves oscillating rotationally around the tool axis of rotation 5. The tool device 1 is held on the machine tool in such a way that the tool axis of rotation 5 and the machine tool axis of rotation 22c are substantially coincident.

Figure 19:
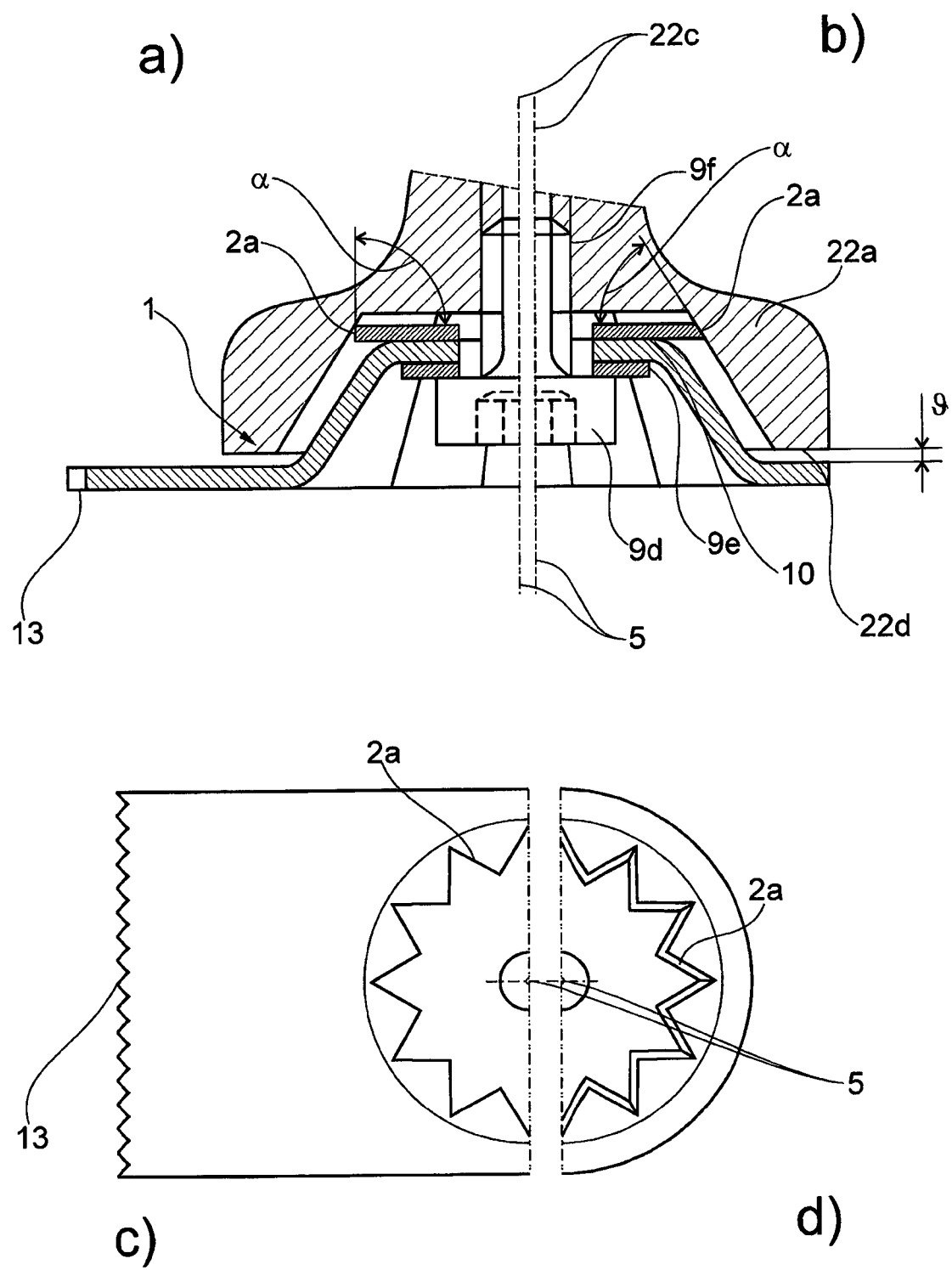
FIG. 19 shows a sectional view, respectively (FIG. 19 a/b) and a plan view (FIG. 19 c/d) of two embodiments of the tool devices with a stepped driving area region.

The FIG. 19 shows two versions of a tool device 1 having with stepped driving area region 2a. This drive surface portions 2a are arranged above the cover area section 10, and preferably they are non-rotatably connected with it, preferably by a form fit locking or a material fit locking, and more preferably welded, riveted, screwed or the like. Here, the FIG. 19 a) and b) each shows a sectional illustration. The FIGS. 19 c) and d) each show a plan view from above of such a tool device 1. The illustration of the tool device 1 in the FIG. 19 is based substantially on the illustration of the FIG. 18, but it is not limited to it. Therefore, below are addressed primarily the differences between them.

In a tool device 1, as it is shown in the FIGS. 19 a) and c), the angle α is substantially equal to 90 degrees. Thereby, it advantageously allows an easy manufacture of the tool device. In the tool device 1, as this is illustrated in the FIGS. 19 b) and d), the angle α is substantially less than 90 degrees. Thereby, advantageously, a larger transmission area for the torque transmission can be achieved.

Next, the FIG. 19 shows how the tool device 1 is attached to the output spindle 22a of the machine tool, preferably by means of a screw device (fixing screw 9d, washer 9e, nut member 9f). The tool device 1 has an operating region 13 to act on a work piece or on a work piece arrangement. By means of the fastening device between the tool device 1 and the output spindle 22a, here preferably designed as a screw device (mounting screw 9d, washer 9e, female connection 9f), the tool device 1 is received on the machine tool and a force is exerted in the direction of the tool axis of rotation 5.

If the tool device is received as scheduled in the machine tool, a small distance δ is obtained between one of the output spindle 22a facing surface of the tool device 1 and a front surface 22d of the output spindle 22a. Preferably, the small distance δ should be understood as a small distance which is in a range, preferably it is smaller than 5 mm, preferably it is smaller than 2.5 mm, and more preferably it is smaller than 1, 5 mm, and most preferably it is smaller than 0.8 mm. Further preferably, this range is larger than 0.0 mm, preferably it is larger than 0.25 mm, and most preferably it is larger than 0.5 mm.

From the stepped driving area regions 2a, the driving forces are transmitted to the operating region 13. In this case, the tool device 1 is held on the machine tool by means of the washer 9e, which exerts a force action by means of the fastening screw 9d on the tool device 1. The transmission of the driving forces of the machine tool on the tool device 1 is achieved primarily by the form fit engagement (form fit connection) to the stepped driving area region 2a in the opposite surfaces in the output spindle 22a. The output spindle 22a is rotationally driven by the oscillating machine tool rotation axis 22c, and transmits this motion to the tool device 1, so that it moves rotationally oscillating around the tool axis of rotation 5.

The tool device 1 is held on the machine tool in such a way that the tool axis of rotation 5 and the machine tool axis of rotation 22c are substantially coincident.

Figure 20:
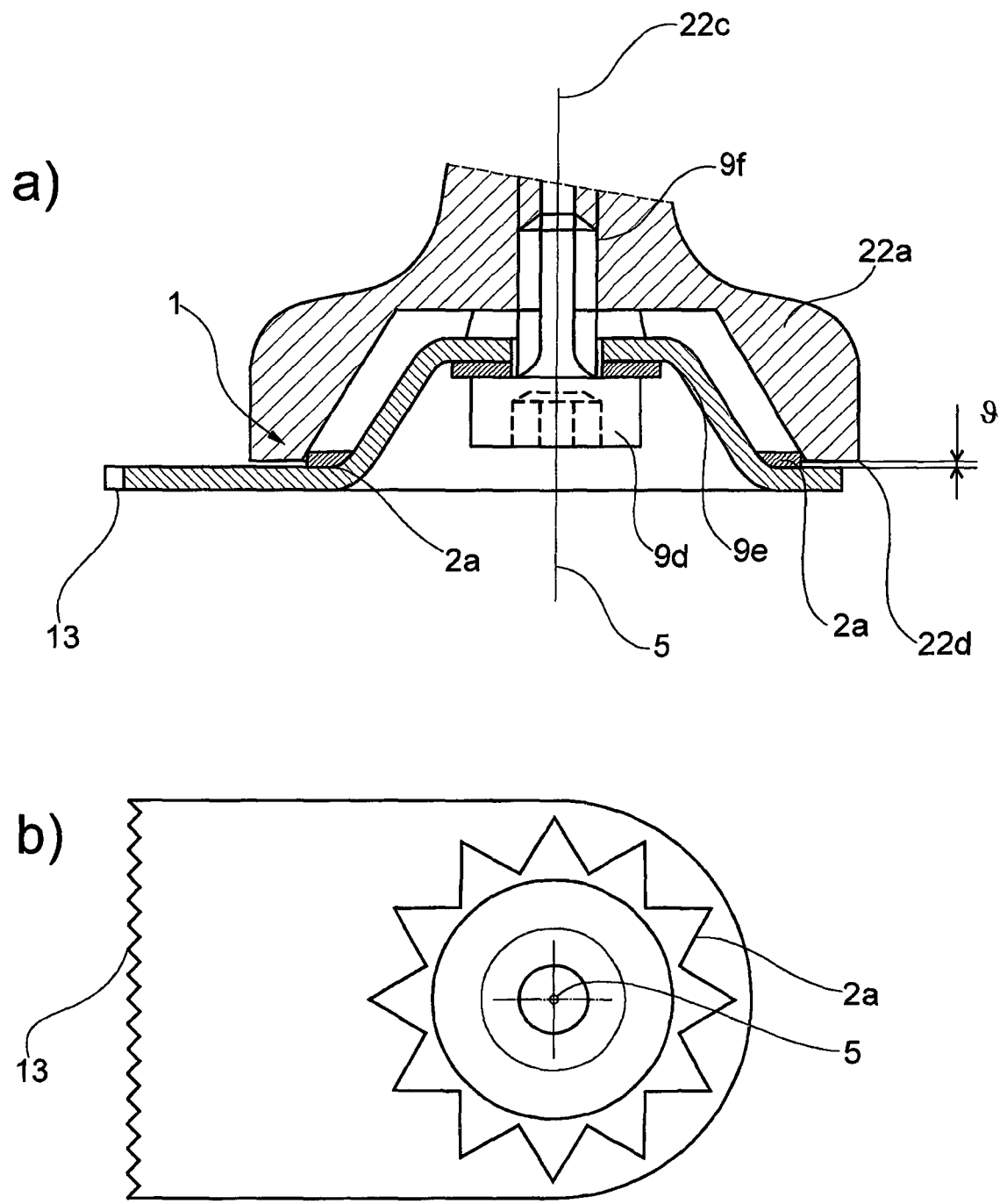
FIG. 20 shows a sectional view (FIG. 20a) and a plan view (FIG. 20b) with a further tool device with the stepped driving area region.

The FIG. 20 shows a further variant of a tool device 1 with the stepped driving area regions 2a. The stepped driving area regions 2a are preferably substantially above, preferably directly above the operating region 13 in the direction of the output spindle 22a, and respectively preferably they are arranged on a surface of the tool device 1. Further preferably, this surface of the tool device is adapted to lie opposite to the end face 22d of the output spindle 22a, when the tool device is received by the machine tool. The driving area regions 2a are preferably rotationally fixedly connected to the tool device 1, preferably by a form fit locking or a material fit locking, more preferably welded, riveted, screwed or the like, or particularly preferably configured integral. The FIG. 20 *a*) shows a sectional view, the FIG. 20 *b*) shows a plan view from above of such a tool device 1. It can be seen in the plan view (FIG. 20*b*) that the stepped driving area regions 2*a* are distributed in a star-shaped manner around the tool axis of rotation. The illustration of the tool device 1 in the FIG. 20 is based primarily on the illustration of the FIG. 18 and the FIG. 19, but it should be not limited to these. Therefore, below are addressed primarily the differences between them.

Next, the FIG. 20 shows how the tool device 1 is attached to the output spindle 22*a* of the machine tool, preferably by means of a screw device (fixing screw 9*d*, washer 9*e*, nut member 9*f*). The tool device 1 has an operating range 13 to act on a work piece or on a work piece arrangement. By means of the fastening device, here preferably configured as a screw device (fixing screw 9*d*, washer 9*e*, female connection 9*f*) between the tool device 1 and the output spindle 22*a*, the tool device 1 is received in the machine tool, and a force is exerted in the direction of the tool axis of rotation 5.

When the tool device is received as scheduled in the machine tool, a small distance δ is obtained between one of the output shaft 22*a* facing surface of the tool device 1 and the end face 22*d* of the output shaft 22*a*. Preferably, the small distance δ is in the range as it is proposed in the embodiment of the FIG. 19.

The holding of the tool device as well as the transmission of the driving forces on the tool device is performed in the same manner as in the embodiment shown the FIG. 19.

In a further embodiment, at least one stepped driving area region 2*a* can be arranged below the top surface section (FIG. 19) and the above tool surface (FIG. 20), which faces the machine tool in the area of the output spindle 22*c*, preferably it the stepped driving area region 2*a* is spaced both below from the cover area section and above from the aforementioned range of the tool surface. This embodiment can be visually perceived as an intermediate variant compared to the embodiments shown in the FIG. 19 and the FIG. 20. Further preferably, the stepped driving area region 2*a* can be formed integrally with at least a portion of the tool device 1 or, preferably, as a separate component, as shown in the FIG. 19 and the FIG. 20, be connected to the tool device 1. The stepped driving area region and the tool device are preferably cohesively, non-positively or positively at such a connection, preferably welded, soldered, riveted, screwed or glued.

Figure 21:
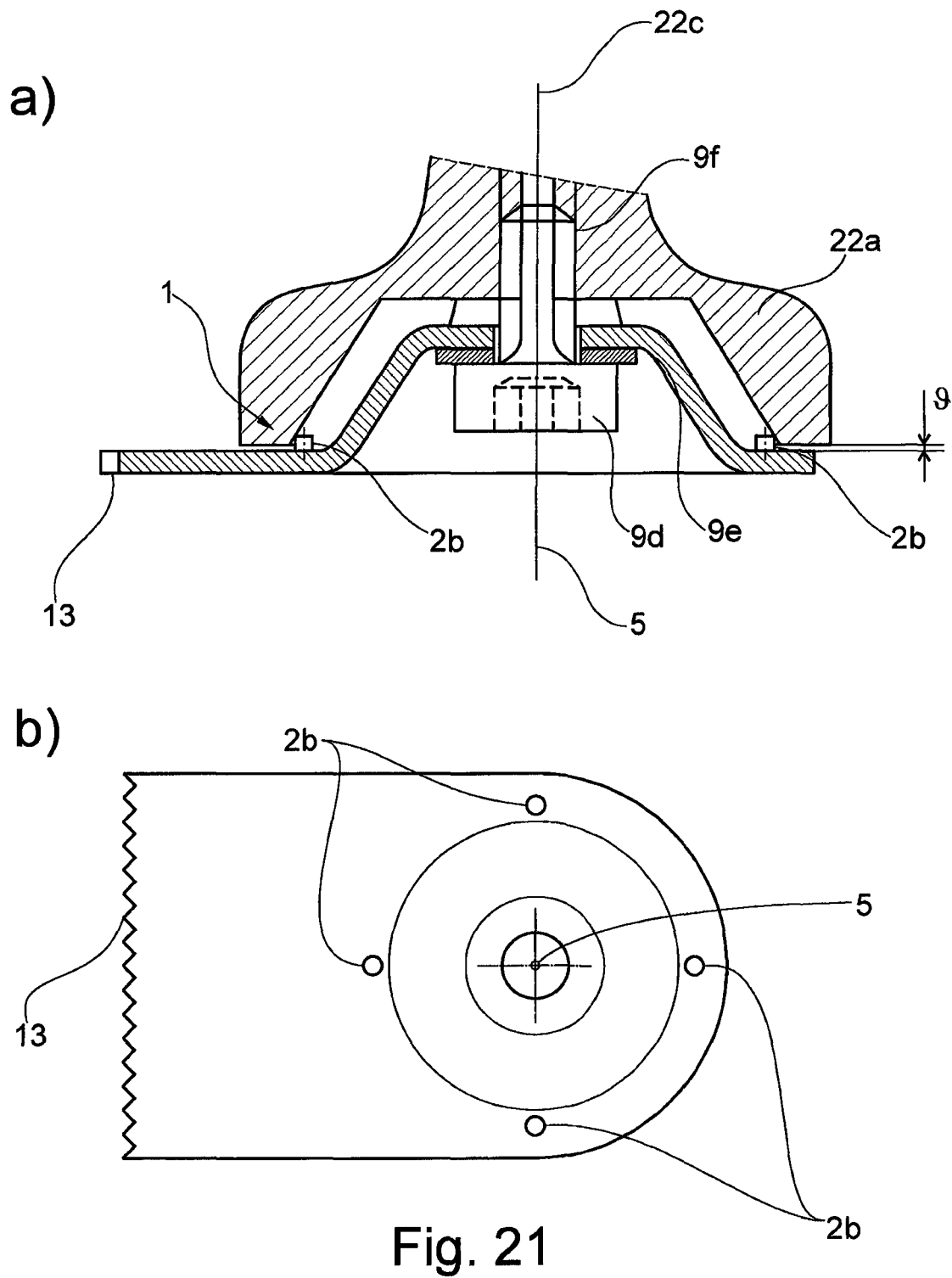
FIG. 21 shows a sectional view (FIG. 21a) and a plan view (FIG. 21b) of a tool device with a raised driving area region.

The FIG. 21 shows an embodiment of a tool device 1 having raised driving area regions 2*b*. The FIG. 21 *a*) shows a sectional view of such a tool device, the FIG. 21 *b*) shows the corresponding top view of the tool device 1. These raised driving area regions 2*b* can preferably have cylindrical portions, as shown in the FIG. 21. Further preferably, it can be carried out alternatively as truncated cones or else preferably as sections with a polygon-shaped cross-section. The shape of the raised driving area regions 2*b* is preferably independent of the rest of the design of the tool device.

This drive surface areas 2*b* are preferably arranged substantially above the operating region 13 in the direction of the output spindle 22*a*, or on a surface of the tool device 1. Further preferably, this surface of the tool device is adapted to lie opposite to the end face 22*d* of the output spindle 22*a*, if the tool device 1 is received in the machine tool. The driving area regions 2*b* are preferably rotatably connected to the tool device 1, preferably form fit or material fit, especially preferably welded, riveted, screwed or the like, or most preferably configured integral. In this case (FIG. 21*b*), it can be seen in plan view that the raised driving area regions 2*b* are distributed preferably rotationally symmetrical, more preferably at an equidistant distance or an integer multiple of an equidistant distance, around the tool axis of rotation. The illustration of the tool device 1 in the FIG. 21 is based primarily on the illustration of the FIG. 18 to FIG. 20, but it should be not limited to this.

Next, the FIG. 21 shows how the tool device 1 is attached to the output spindle 22*a* of the machine tool, preferably by means of a screw device (fixing screw 9*d*, washer 9*e*, nut member 9*f*). The tool device 1 has an operating region 13 to act on a work piece or on a work piece arrangement. By means of the fastening device, here preferably as a screw device (fixing screw 9*d*, washer 9*e*, female connection 9*f*) configured between the tool device 1 and the output spindle 22*a*, the tool device 1 is received on the machine tool and a force is exerted in the direction of the tool axis of rotation 5.

When the tool device is received as scheduled in the machine tool, a small clearance δ is obtained between the output spindle 22*a* facing surface of the tool device 1 and the end face 22*d* of the output spindle 22*a*. The distance δ is preferably in the range as it is proposed in the embodiment of the FIG. 19.

The holding of the tool device is performed in the same manner as in the embodiment shown in the FIG. 19. In the embodiment (FIG. 21) with raised driving surface regions 2*b* these engage in corresponding mating surfaces on the machine tool, and the transmission of the driving forces on the tool device is performed in a form fit manner.

Figure 22:
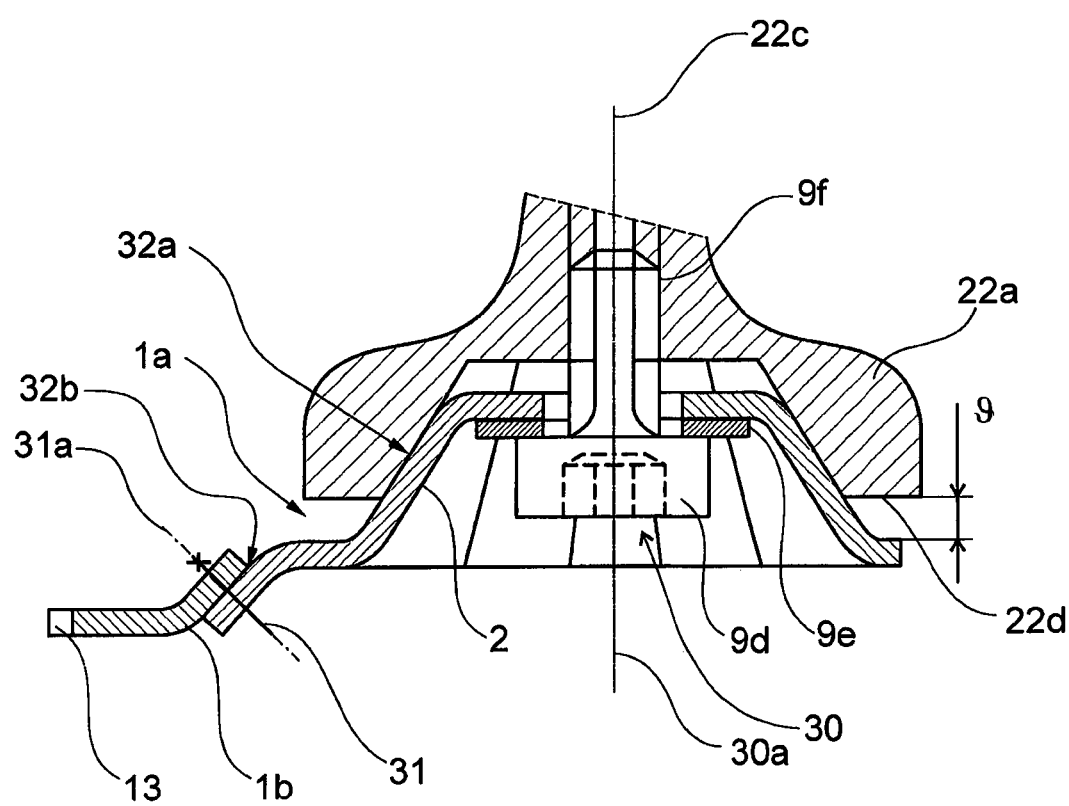
FIG. 22 shows a sectional view of a tool device, the output spindle and a connection device with a first connection region and a second connection region.

The FIG. 22 shows a sectional view of a connection device 1*a* for the connecting of a third tool device 1*b* with an output spindle 22*a* of the machine tool. The connection device 1*a* is held to the output spindle 22*a* and thus to the machine tool by means of a first holding device 30. The holding device 30 preferably has a fastening screw 9*d* and a washer 9*e*, a nut member 9*f* is disposed in the output spindle 22*a*. The connection device 1*a* is received at the output spindle 22*a* in such a way that a small distance θ is obtained between an end face 22*d* of the output spindle 22*a* and a surface of the connection device facing of the tool device, preferably the surface opposite to the end face 22*d*. By the short distance, it can be achieved a secure receiving of the connection device 1*a* at the output spindle 22*a*. At the connection device 1*a*, a third tool device 1 *b* can be attached by means of a second holding device 31. The second holding device 31 comprises a second holding shaft 31*a*, the first holding device 30*a* has a first holding shaft 30*a*. The first holding shaft 30*a* substantially coincides with the connection axis of rotation. The first holding shaft 30*a* and the second holding shaft 31*a* are arranged obliquely to each other. The third tool device 1*b* has a operating region 13, this operating region 13 is adapted to act on a work piece arrangement.

For a form fit torque transmission, the connection device 1*a* comprises an attachment device with driving area regions 2. The driving area regions 2 are engaged with the output spindle 22*a* in counter surfaces. By this form fit engagement, the driving forces are safely transmitted from the output spindle 22*a* driven by the machine tool axis of rotation 22*c* in a rotating-oscillating manner to the connection device 1*a*, and thus to the second tool device.

The connecting device 1*a* is connected in a first connection region 32*a* with the machine tool, and a holding force acting on the connection device 1*a* is preferably applied in the direction of the first holding shaft 30*a*, or respectively a movement of the connection device 1a in the direction of the first holding shaft is, at least partially, prevented. Further, the third tool device 1b can be connected in a second connection region 32b of the connection device 1a. In this case, this connection can be a form fit connection, preferably a material fit connection, or more preferably a force fit connection. Preferably, in the direction of the second holding shaft 31a, a holding force is exerted on the tool device 1b or on the connection device 1a, respectively. Preferably, the second holding device 31 comprises a screw device, more preferably for applying the holding force effect.

Figure 23:
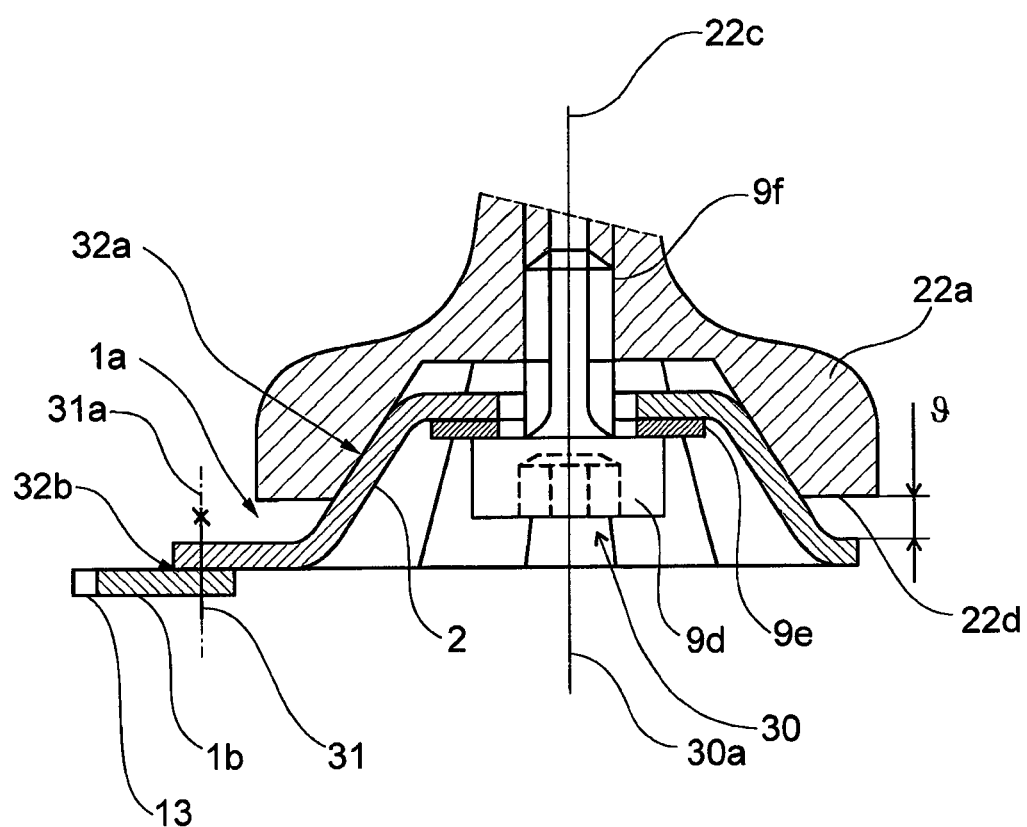
FIG. 23 shows a sectional view of a tool device, the output spindle and a further embodiment of a connection device.

The FIG. 23 shows a sectional view of a connection device 1 a, which is similar to the connection device shown in the FIG. 22. Therefore, below are addressed primarily the differences between these two connection devices.

The third tool device 1b is held on the connection device 1a by means of the second holding device 31. The second holding device 31 exerts in the direction of the second holding shaft 31a a holding force effect of the third tool device 1b, and preferably also on the connection device 1a. The tool device 1 we connected via the second connection portion 32b to the connecting means 1 a. In this case, this connection can be preferably a form fit connection, preferably a material fit connection, or more preferably a force fit connection. The second support shaft 31 a is oriented substantially parallel to the first support shaft 30a, more preferably, the first and second supporting shaft spaced from each other.

Figure 24:
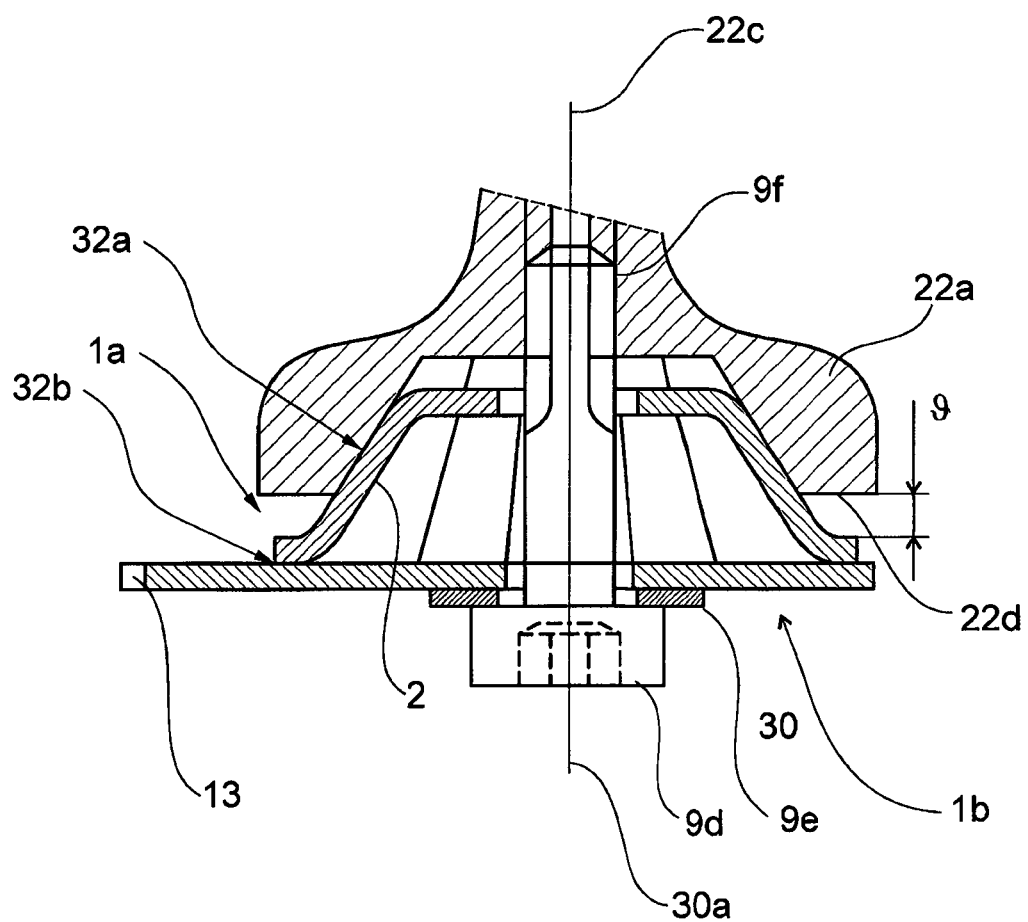
FIG. 24 shows a sectional view of another embodiment of a connection device, here with a frictional torque transmission from the connection device to the tool device.

The FIG. 24 shows a sectional view of a connecting device, which essentially corresponds to that of FIG. 22 and also of the connecting device shown in FIG. 23. The following will therefore focus on the differences between these embodiments.

The third tool device 1b is held by means of the first holding device 30 and the second connection region 32b of the connection device 1a. The first holding device 30 exerts in the direction of the first holding shaft 30a of a holding force on the third tool device 1b, and preferably also on the connection device 1a. This connection may be preferably a form fit connection, preferably a material fit connection, or more preferably a force fit connection. Further preferably, said third tool device and said connecting device comprise raised recesses sections, preferably, these raised sections are in connection with these recesses for a form fit torque transmission from the connecting device 1a to the third tool device 1b.

Figure 25:
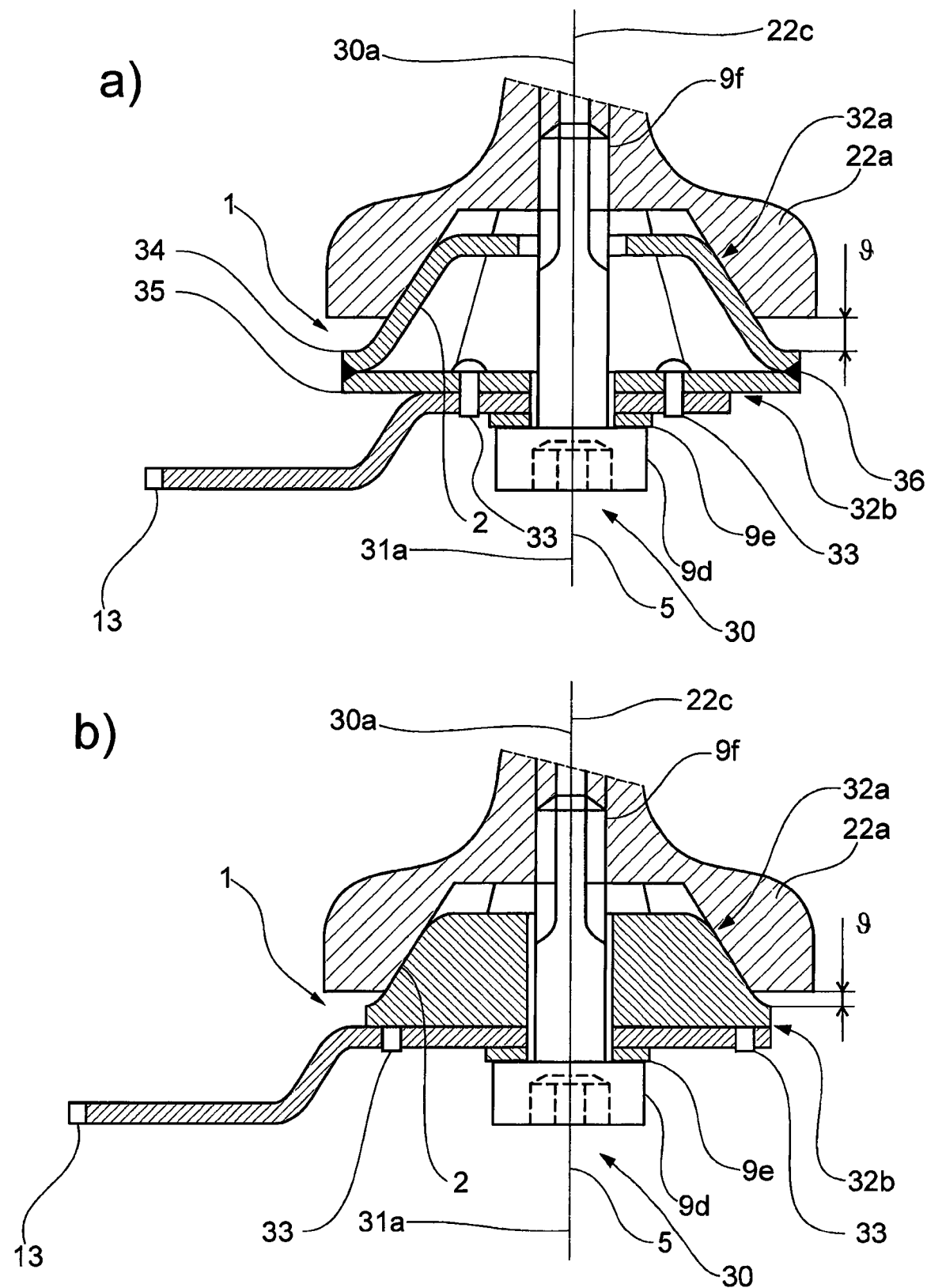
FIG. 25 shows two cross-sectional views of further embodiments of the connecting device with a form fit torque transmission (FIG. 25a, a hollow body.

The FIG. 25a shows a sectional view of a connection device with form fit torque transmission from the connection device on the tool device. The connecting device is at least partially formed as a hollow body, and thereby it has, in particular a low moment of inertia. Both the embodiments illustrated in the FIG. 25a and in the FIG. 25b are similar to the previously described embodiments of the connection device. Therefore, below are addressed primarily the differences between these two connection devices.

The tool device 1 is held on the output shaft 22a of the machine tool by means of a first holding device 30, in particular a fastening screw 9d, a washer 9e and nut member 9f. The torque transmission from the connection device on the tool device 1 is at least partly achieved by means of the form fitting elements 33rd. The form fitting elements 33 may preferably be integrally formed with the connection device, or preferably as own components inserted into these, or fixed to these.

The connection device is received in the axial direction, i.e. in the direction of the machine tool axis of rotation 22c in such a manner that a small distance $\vartheta$ is obtained.

Thereby, it can be achieved that the connection device can be held on the machine tool, as far as the tool device is severely stressed, in particular by bending momentums perpendicular to the tool axis of rotation. In particular, by this holding, a tilting of the tool device can be counteracted, and the connection device and with it the tool device can be particularly securely received on the machine tool.

The connection device may preferably be composed of several parts, particularly preferably the base body is composed of the two parts 34 and 35. Thereby, it can be achieved that the connection device has on the one hand a low weight (hollow body), and that on the other hand it consist of parts which are relatively simple to produce.

Further preferably, these several parts can be connected to one another at one or several connection points 36 in a material fit manner. By such a configuration of the connection device, a particularly easy connection device can be achieved, which in particular due to low forces of inertia only a low stress induce.

Next, the tool device 1 is accommodated on the output spindle 22a by means of the connection device in such a way that the tool axis of rotation 5 and the machine tool axis of rotation 22c are substantially coincident. The connecting device is connected in a first connecting portion 32a with the output spindle 22a of the machine tool. Furthermore, the tool device 1 is connected in a second connection region 32b to the connection device. In this case, the drive torque is transmitted to the connection device (first connection portion 32a) from the machine tool by means of the driving area region 2 in form fit matter.

The form fitting elements 33 (FIG. 25a/b) are preferably spaced apart to the tool axis of rotation 5. Furthermore, these are offset around the tool axis of rotation preferably by an equidistant angle or, preferably, by an integer multiple of such an angle. Further preferably, the form fitting elements 33 or a plurality of groups of the form fitting elements are arranged with rotational symmetry around the tool axis of rotation.

The tool device 1 has an operating region 13, which is adapted to act on a work piece or on a work piece arrangement (not shown).

The FIG. 25b shows a sectional view of a connection device with form fit torque transmission from the connection device on the tool device 1 (second connection portion 32b). Here, the connection device is, unlike for the embodiment shown in the FIG. 25a, formed essentially as a solid body and it has, in particular a high form stability, and it is particularly easy to manufacture. The embodiment illustrated in the FIG. 25b corresponds essentially to the embodiment shown in the FIG. 25a. Therefore, below are addressed primarily the differences between these embodiments.

The tool device 1 is held on the output spindle 22a of the machine tool by means of a first holding device 30, which has in particular a fastening screw 9d, a washer 9e, and a nut member 9f. The torque transmission from the connection device to the tool device 1 is at least partly achieved by means of the form fitting elements 33.

The connection device is received in the axial direction, i.e. in the direction of the machine tool axis of rotation 22c in such a way that a small distance $\delta$ is obtained, whereby a particularly secure receiving of the tool device on the machine tool can be achieved.

The connection device, in particular its base body, may preferably be formed integral, preferably at least the base body of the connection device is produced by a primary shaping manufacturing method or by a reshaping manufacturing method such as these have already been described also for the manufacturing of the tool device, preferably a forging, a sintering, generative manufacturing processes and the like.

By means of the connection device, the tool device 1 so received on the output spindle 22a, that the tool axis of rotation and the machine tool axis of rotation substantially coincide. The connecting device is connected in a first connecting portion 32a with the output shaft 22a. Further, the tool device 1 is connected in a second connection region 32b to the connection device. In this case, also the driving torque is transmitted from the machine tool to the connection device by the driving area regions 2 in a form fit manner.

The tool device 1 has an operating region 13, which is adapted to act on a work piece or on work piece arrangement (not shown).

LIST OF REFERENCE SIGNS 1 tool device
1a connection device
1b second tool device
2 driving area region/tool driving area region
2a stepped driving area region
2b raised driving area region
3 surface point
4 tangent plane
5 tool axis of rotation
6 radial plane
7 axial plane
8 boundary plane
8a upper boundary plane
8b lower boundary plane
9 plane of symmetry
9d fastening screw
9e washer
9f nut member
9g tie bar device
10 cover surface section
10a lower section of the cover surface section
11 connection region
12 attachment device
13 operating region
14 reference plane
15 reference diameter
16 encoding device
16a raised encoding device
16b encoding device having a recess
17 transition region
22 machine tool
22a output spindle
22b operating lever
22c machine tool axis of rotation
22d end face of the output spindle
30 first holding device
30a first holding shaft
31 second holding device
31a second holding shaft
32a first connection region
32b second connection region
33 form fit element
34 first subcomponent of the connection device
35 second subcomponent of the connection device
36 connecting region between 34 and 35
α first inclination angle
β second inclination angle
t thickness of the side wall
T extension of a driving area region
$R_I$ first radius of curvature of a driving area region
$R_{Ia}$ variable radius of curvature of a driving area region
$R_{II}$ second radius of curvature of a driving area region
a straight extending grid line of a driving area region
$b_I$ first curved grid line of a driving area region
$b_{II}$ second curved grid line of a driving area region
$b_I$ a third grid line with variable curvature of a driving area region
Δ distance to 14
δ distance from tool device to output spindle in the direction of 5
k1 key width, spacing of parallel driving surface areas
k2 first outside diameter of the attachment device
K3 second outer diameter of the attachment device
k4 reference diameter
K5 rounding region
k6 first radius of curvature
K7 second rounding radius
K8 third radius of curvature
k9 fourth radius of curvature
k10 diameter of the recess
k11 deep attachment device
k12 polygon angle
k13 inclination angle

What is claimed is:

1. A tool device, adapted for use with an oscillating machine tool, the machine tool having a driving device moving around a driving axis, the tool device comprising:
   an attachment device by which the tool device can be fastened to the machine tool in such a manner that the driving axis and a tool axis of rotation are substantially coincident,
   wherein the attachment device, for receiving a driving force, comprises at least two driving area regions each having a plurality of surface points and which are spaced from the tool axis of rotation,
   wherein tangent planes are inclined on the surface points with respect to an axial plane that includes the tool axis of rotation,
   wherein the tangent planes are inclined with respect to a radial plane that extends perpendicularly to the tool axis of rotation,
   wherein an angle (α) is enclosed between one of the tangent planes and the radial plane, wherein the angle (α) is smaller than 80 degrees and larger than 45 degrees,
   wherein the attachment device comprises a side wall,
   wherein the side wall extends radially spaced from the tool axis of rotation,
   wherein the side wall extends between a first upper boundary plane and a second lower boundary plane, and
   wherein the side wall comprises the at least two driving area regions.

2. The tool device according to claim 1, wherein at least one of the driving area regions are, at least in sections, substantially planar or are, at least in sections, curved.

3. The tool device according to claim 1, wherein at least one of the driving area regions extends between the first upper boundary plane and the second lower boundary plane.

4. The tool device according to claim 1, wherein the tool device in a region of the attachment device has a wall thickness of substantially (t),
   wherein a first boundary plane and a second boundary plane are spaced apart from each other by a distance (T), and wherein the distance (T) is greater than 1 times (t) and is smaller than 20 times (t).

5. The tool device according to claim 1, further comprising a plurality of driving area regions that are arranged rotationally symmetrically around the tool axis of rotation.

6. The tool device according to claim 1, wherein the at least two driving area regions are arranged symmetrically to a plane of symmetry,
wherein the tool axis of rotation is located in the plane of symmetry, and
wherein the at least two driving area regions are arranged substantially contiguously.

7. The tool device according to claim 1, wherein the side wall has an average wall thickness ($t_1$) that is greater than or equal to 0.2 mm and is less than or equal to 4 mm; and/or
wherein the side wall extends substantially radially closed around the tool axis of rotation.

8. The tool device according to claim 1, wherein the attachment device comprises a cover area portion,
wherein the cover area portion is directly or indirectly connected to at least one of the driving area regions,
wherein an extent of the cover area portion has at least one component perpendicular to the tool axis of rotation.

9. The tool device according to claim 8, wherein the cover area portion is disposed substantially in a region of the first upper boundary plane.

10. The tool device according to claim 8, wherein
the cover area portion extends radially towards the tool axis of rotation,
wherein the cover area portion has at least one recess.

11. The tool device according to claim 1, wherein a normal vector on one of the tangent planes is oriented away from the tool axis of rotation in a radial direction.

12. The tool device according to claim 1, wherein the tool device comprises at least one operating region and at least one connection region,
wherein the operating region is arranged to act on a workpiece arrangement or on a workpiece, and
wherein the at least one connection region is arranged between the attachment device and the operating region.

13. The tool device according to claim 12, wherein the at least one connection region is formed integrally with the at least one operating region and/or the at least one attachment device; or
wherein the at least one connection region is connected to the at least one operating region and/or the at least one attachment device by means of a form fit connection, a force fit connection, a material fit connection, or a combination of several of these types of connection.

14. The tool device according to claim 1, wherein the angle (α) is smaller than 75 degrees and the angle (α) is larger than 60 degrees.

15. The tool device according to claim 1, wherein an angle (β) is included between one of the tangent planes and the axial plane, wherein said tool axis of rotation is arranged in the axial plane, the angle (β) is preferably equal to or smaller than 90 degrees and the angle (β) is larger than 0 degrees.

16. The tool device according to claim 1, wherein the attachment device has an even number of driving area regions.

17. A series of at least two tool devices in accordance with claim 1.

18. The series of at least two tool devices in accordance with claim 17, wherein:
each tool device of the series has a reference plane;
the reference plane is arranged perpendicularly to the tool axis of rotation;
the reference plane has a reference diameter of the driving area regions; and
for different tool devices of the series, a distance (Δ) of a first surface of a cover area portion to the reference plane is between a first lower limit and a second upper limit, wherein the first lower limit is larger than 0.01 mm and the second upper limit is smaller than 0.5 mm.

19. The series of at least two tool devices in accordance with claim 17, wherein different types of the tool devices of the series have different wall thicknesses t.

20. The series of at least two tool devices in accordance with claim 17, wherein
each tool device has an encoding region which is arranged with respect to its position substantially equally with respect to the tool axis of rotation and to the driving area regions, and
each tool device is characterized by at least one application parameter, and
the encoding region comprises at least one encoding device which is characteristic for the at least one application parameter.

21. The series of at least two tool devices in accordance with claim 20, wherein a shape of a base area of at least one encoding device is selected from a group of shapes consisting of:
a polygon having a plurality of corners;
a circle;
an ellipse;
an arc with a variable radius or a constant radius; and
a combination of two or more of these shapes.

22. The series of at least two tool devices in accordance with claim 20, wherein at least two of the encoding devices have the same geometric shape, but a different size.

23. The series of at least two tool devices in accordance with claim 20, wherein at least one of the encoding devices is constructed as a raised region with respect to an encoding reference plane, and at least one dimension of the at least one encoding device is larger than the respective dimension of the other encoding device, or
at least one of the encoding devices is constructed as a recess, and at least one dimension of the at least one encoding device is larger than the respective dimension of the other encoding device.

24. The series of at least two tool devices in accordance with claim 20, wherein the encoding regions are arranged in a region of a cover area portion.

25. A method of manufacturing a tool device according to claim 1, wherein the method includes:
manufacturing a driving area region using a primary shaping process step, a reshaping process step, a generative process step, or a combination of several of the process steps; and
manufacturing a tool contour using a separating process step, a thermally separating process step, a mechanically separating process step, or a combination of several of the process steps.

26. The tool device according to claim 1, wherein at least a portion of the side wall of the tool device is arranged to be received by or in the driving device of the machine tool.

27. A machine tool and tool device combination, comprising:
a machine tool with a driving device moving around a driving axis; and
a tool device suitable for use with the machine tool, the tool device according to claim 1, wherein at least a portion of the side wall of the tool device is configured to be received by or in the driving device of the machine tool.

28. The machine tool and tool device combination of claim 27, wherein said portion of the side wall of the tool device is received by or in the driving device of the machine tool.

29. A connection device which is suitable for connecting a tool device with an oscillating machine tool, the oscillating machine tool having a driving device moving around a driving axis,
wherein the connection device comprises a first connection region and a second connection region,
wherein the first connection region is arranged for connecting the connection device with the machine tool, wherein the connection device can be connected to the machine tool in such a way that the driving axis and a connection axis of rotation substantially coincide,
wherein the second connection region is arranged for connecting the connection device with the tool device,
wherein at least one of said connection regions comprises an attachment device by which the tool device can be fastened to the machine tool in such a manner that the driving axis and a tool axis of rotation are substantially coincident,
wherein the attachment device, for receiving a driving force, comprises at least two driving area regions each having a plurality of surface points and which are spaced from the tool axis of rotation,
wherein tangent planes are inclined on the surface points with respect to an axial plane that includes the tool axis of rotation,
wherein the tangent planes are inclined with respect to a radial plane that extends perpendicularly to the tool axis of rotation,
wherein an angle ($\alpha$) is enclosed between one of the tangent planes and the radial plane, wherein the angle ($\alpha$) is smaller than 80 degrees and larger than 45 degrees,
wherein the attachment device comprises a side wall,
wherein the side wall extends radially spaced from the tool axis of rotation,
wherein the side wall extends between a first upper boundary plane and a second lower boundary plane, and
wherein the side wall comprises the at least two driving area regions.

30. The connection device according to claim 29, wherein the first connection region is arranged rotationally symmetrically to the connection axis of rotation, and/or
the second connection region is arranged rotationally asymmetrically or rotationally symmetrically to the connection axis of rotation.

31. The connection device according to claim 29, wherein the connection device comprises a first holding device, and the first holding device is adapted to cooperate with at least said first connection region and the machine tool; and/or
the connection device has at least one second holding device, and
the second holding device is arranged to cooperate with the second connection region and a tool device.

32. The connection device according to claim 29, wherein the first holding device has a first holding axis,
the second holding device has a second holding axis, and
the first holding axis and the second holding axis are arranged substantially parallel or are arranged askew with respect to each other.

33. A tool device, adapted for use with an oscillating machine tool, the machine tool having a driving device moving around a driving axis, the tool device comprising:
an attachment device by which the tool device can be fastened to the machine tool in such a manner that the driving axis and a tool axis of rotation are substantially coincident,
wherein the attachment device, for receiving a driving force, comprises at least two driving area regions each having a plurality of surface points and which are spaced from the tool axis of rotation,
wherein tangent planes are inclined on the surface points with respect to an axial plane that includes the tool axis of rotation,
wherein the tangent planes are inclined with respect to a radial plane that extends perpendicularly to the tool axis of rotation,
wherein an angle ($\alpha$) is enclosed between one of the tangent planes and the radial plane, wherein the angle ($\alpha$) is smaller than 80 degrees and larger than 45 degrees,
wherein the tool device comprises, in the region of the attachment device, at least one first upper boundary plane and at least one second lower boundary plane,
wherein the boundary planes are disposed substantially perpendicularly to said tool axis of rotation and spaced apart from each other,
wherein each of the driving area regions is arranged between one of the at least one first upper boundary planes and one of the at least one second lower boundary planes,
wherein the attachment device comprises a cover area portion,
wherein the cover area portion is directly or indirectly connected to at least one of the driving area regions,
wherein an extent of the cover area portion has at least one component perpendicular to the tool axis of rotation, and
wherein the cover area portion is disposed substantially in a region of one of the at least one first upper boundary planes.

* * * * *